(12) United States Patent
Kohno et al.

(10) Patent No.: US 11,331,871 B2
(45) Date of Patent: May 17, 2022

(54) PRESS LOAD MEASURING APPARATUS AND METHOD FOR PRESS MACHINE

(71) Applicant: AIDA ENGINEERING, LTD., Kanagawa (JP)

(72) Inventors: Yasuyuki Kohno, Kanagawa (JP); Kazuki Honjo, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 204 days.

(21) Appl. No.: 16/716,118

(22) Filed: Dec. 16, 2019

(65) Prior Publication Data

US 2020/0307137 A1  Oct. 1, 2020

(30) Foreign Application Priority Data

Mar. 26, 2019  (JP) .............................. JP2019-058076

(51) Int. Cl.
*B30B 15/00* (2006.01)
*B30B 1/26* (2006.01)
*G01L 5/00* (2006.01)

(52) U.S. Cl.
CPC ............ *B30B 15/0094* (2013.01); *B30B 1/26* (2013.01); *G01L 5/0061* (2013.01)

(58) Field of Classification Search
CPC ... B30B 15/0094; B30B 15/281; B30B 15/14; B30B 15/26; B30B 1/26; G01L 5/0061
USPC .......................................................... 73/774
See application file for complete search history.

(56) References Cited

U.S. PATENT DOCUMENTS

| 4,116,050 A | * | 9/1978 | Tanahashi ........... B30B 15/0094 100/99 |
| 5,186,043 A | * | 2/1993 | Yamaoka .............. G01L 1/2231 73/117.03 |
| 5,450,756 A | * | 9/1995 | Kirii ...................... B21D 24/08 73/825 |

FOREIGN PATENT DOCUMENTS

JP  6-55300 A  3/1994

* cited by examiner

*Primary Examiner* — Teresa M Ekiert
*Assistant Examiner* — Teresa A Guthrie
(74) *Attorney, Agent, or Firm* — McDermott Will & Emery LLP

(57) ABSTRACT

A press load measuring apparatus for a press machine of 1-point type includes: a plurality of strain gauges attached to the respective columns of the press machine, the plurality of strain gauges detecting respective strains generated in the respective columns in association with a press load acting on the slide; a bending moment calculator configured to calculate bending moments acting on respective columns based on an angle formed between a direction of movement of the slide and the connecting rod; and a press partial load calculator configured to calculate press partial load signals corresponding to the respective columns, an impact of bending strain components caused by the bending moments included in the strain signals being eliminated from the press partial load signals based on the bending moments acting on the respective columns detected by strain gauges attached to the respective columns.

11 Claims, 22 Drawing Sheets

PRESS LOAD MEASURING APPARATUS AND METHOD FOR PRESS MACHINE

CROSS-REFERENCE TO RELATED APPLICATIONS

The present application claims priority under 35 U.S.C. § 119 to Japanese Patent Application No. 2019-058076 filed on Mar. 26, 2019. The above application is hereby expressly incorporated by reference, in its entirety, into the present application.

BACKGROUND OF THE INVENTION

Field of the Invention

The present invention relates to a press load measuring apparatus and method for a press machine, and more particularly to a press load measuring apparatus and method for a press machine of 1-point type configured to drive a slide via one connecting rod.

Description of the Related Art

In the related art, there has been proposed a technique in which strain gauges are attached respectively to a plurality of columns of a press machine, and a press load is measured from strains of the respective columns detected by the respective strain gauges (Japanese Patent Application Laid-Open No. H06-55300).

In a method of measuring a press load described in Japanese Patent Application Laid-Open No. H06-55300, the press load is derived from the sum of the resistance values of the strain gauges provided for the respective columns in a pressing device having the plurality of columns.

Specifically, the strain gauges are attached respectively to four columns, and changes in resistance values R1 to R4 of the respective strain gauges are detected as a voltage by a Wheatstone bridge circuit, and the press load is measured depending on the magnitude of the voltage.

Here, the resistance values R1 to R4 of the respective strain gauges are R1=R2=R3=R4 in an initial state, and R1+R2+R3+R4=R (where R is a fixed resistance of the Wheatstone bridge circuit).

When the pressing device is activated and a strain occurs in four columns, the resistance values R1 to R4 of the strain gauges attached to the respective columns change to be R1+R2+R3+R4≠R, and the Wheatstone bridge circuit detects a voltage corresponding to a change in the resistance value (R1+R2+R3+R4).

CITATION LIST

Patent Literature: Japanese Patent Application Laid-Open No. H06-55300

SUMMARY OF THE INVENTION

In a press machine of 1-point type configured to drive a slide via one connecting rod, a lateral load acts on the slide according to an angle formed between a direction of movement of the slide (the vertical direction of the press machine) and the connecting rod, and a bending moments act on a plurality of columns (frames) of the press machine under the impact of the lateral load.

Therefore, in the press machine of 1-point type, the respective columns are bent by bending moments acting on the plurality of columns, and strain gauges attached to the respective columns of the press machine for measuring a press load detects strains being impacted by a bending strain (having an error) caused by the bending moments acting on the respective columns.

Therefore, press partial loads calculated based on the strains detected by the strain gauges corresponding to the respective columns (a load of the press load shared by the respective columns) have been larger than or smaller than actual values depending on the slide position in a region where a slide position is larger than a bottom dead center.

This confused users who tried to inspect the causal relationship between the press partial load (press load) and the result of molding.

In addition, in recent years, press machines are advanced by employing a servo system or by using Internet such as IOT (Internet of Things) to achieve easy communication of a state quantity of the press machine as digital information, and, on the other hand, the press machines are not evolved in terms of measurement of the basic (physical) press load (the accuracy is not improved).

Japanese Patent Application Laid-Open No. H06-55300 does not describe the press machine of 1-point type, and does not describe about a problem that a lateral load acts on the slide in accordance with the angle formed between the direction of movement of the slide and the connecting rod, and that the press load cannot be accurately measured under the impact of the lateral load.

According to the method of measuring a press load described in Japanese Patent Application Laid-Open No. H06-55300, the press load is measured by the sum of the resistance values of strain gauges provided in the respective columns, but the press partial loads shared by the respective columns are not measured.

In view of such circumstances, it is an object of the invention to provide a press load measuring apparatus and method for a press machine capable of accurately measuring press partial loads corresponding to respective columns of a press machine of 1-point type.

In order to achieve the above-described object, the invention according to one aspect provides a press load measuring apparatus for a press machine of 1-point type configured to drive a slide via one connecting rod, the press load measuring apparatus including: a plurality of strain gauges attached to a plurality of columns of the press machine respectively, the plurality of strain gauges detecting respective strains generated in the plurality of columns in association with a press load acting on the slide, a bending moment calculator configured to calculate bending moments acting on respective columns of the plurality of columns based on an angle formed between a direction of movement of the slide and the connecting rod, and a press partial load calculator configured to respectively calculate press partial loads corresponding to the respective columns of the plurality of columns, an impact of a bending strain component being eliminated from the press partial loads based on the strains detected by the strain gauges attached to the respective columns of the plurality of columns and the bending moments acting on the respective columns, the impact of the bending strain components caused by the bending moments included in the detected strains.

In the case of the press machine of 1-point type, the bending moments act on the respective columns in a region where a slide position is larger than a bottom dead center in accordance with the angle formed between the direction of movement of the slide and the connecting rod. As a result, the strain gauges attached to the respective columns detect strains including impacts (errors) of the bending strains caused by the bending moments acting on the respective columns.

According to one aspect of the invention, a press partial load with high degree of accuracy without being impacted by the bending moments can be measured by calculating the bending moments acting on the respective columns of the plurality of columns and calculating the press partial loads with impacts of the bending strain components caused by the bending moments and included in the strains detected by the respective strain gauges eliminated.

In the press load measuring apparatus for a press machine according to another aspect of the invention, it is preferable that the bending moment calculator calculates bending moments acting on the respective columns of the plurality of columns based on an angle formed between the direction of movement of the slide and the connecting rod and the press loads acting in the direction of movement of the slide.

In the press load measuring apparatus for a press machine according to still another aspect of the invention, it is preferable that the press partial load calculator includes: a first press partial load calculator configured to calculate first press partial loads corresponding to the respective columns of the plurality of columns based on the strains detected by the strain gauges attached to the respective columns; and an error calculator configured to calculate errors caused by the bending moments included in the first press partial loads based on bending moments acting on the respective columns for the respective columns of the plurality of columns, and the errors calculated for the respective columns from the first press partial loads calculated for the respective columns are eliminated to calculate press partial loads corresponding to the respective columns. In other words, the first press partial loads corresponding to the respective columns (loads including errors due to bending moments) are calculated based on the strains detected by the strain gauges, and the errors included in the first press partial loads are calculated based on the bending moments acting on the respective columns, and the errors are eliminated from the first press partial loads, so that the press partial loads with high degree of accuracy are calculated.

In the press load measuring apparatus for a press machine according to still another aspect of the invention, it is preferable that the press partial load calculator includes: a bending strain calculator configured to calculate bending strains caused by the bending moments included in the strains detected by the strain gauges attached to the respective columns based on the bending moments acting on the respective columns for the respective columns; and a strain calculating unit configured to eliminate the bending strains calculated from the strains detected by the strain gauges attached to the respective columns for the respective columns to calculate calibrated strains, and the press partial loads corresponding to the respective columns of the plurality of columns are calculated based on the calculated strains of the respective columns after the calibration. In other words, the errors of the bending strains caused by the bending moments are eliminated from the strains detected by the strain gauges (strains including the error), and the press partial loads with high degree of accuracy is calculated based on the calibrated strains.

According to another aspect of the invention, there is provided a press load measuring apparatus for a press machine of 1-point type configured to drive a slide via one connecting rod, the press load measuring apparatus including: a plurality of pairs of strain gauges attached respectively to a plurality of columns of the press machine and configured to detect strains generated in the plurality of columns in association with a press load acting on the slide, the plurality of pairs of strain gauges being attached to both surfaces of the respective columns with intermediary of neutral surfaces respectively; and a press partial load calculator configured to add the strains detected by a pair of strain gauges corresponding to the respective columns out of the plurality of pairs of strain gauges, and calculate press partial loads corresponding to the respective columns of the plurality of columns based on the added strains.

According to a further aspect of the invention, the pair of strain gauges are attached to both surfaces of the respective columns with the intermediary of the neutral surfaces respectively, and the strains detected by the pair of strain gauges are added to cancel bending strains (bending strains in an expanding direction and a compressing direction) of the respective columns caused by the bending moments. By calculating the press partial loads corresponding to the respective columns based on the strains after the addition, the press partial loads with high degree of accuracy without including the errors caused by the bending moments are calculated.

In the press load measuring apparatus for a press machine according to still another aspect of the invention, it is preferable that the press load measuring apparatus for a press machine further includes a Wheatstone bridge circuit configured to output voltages corresponding to the added strains, the Wheatstone bridge circuit includes resistances of the pair of strain gauges connected in series, and the resistances of the pair of strain gauges have resistance values in an initial state being half a resistance value of a fixed resistance of the Wheatstone bridge circuit. According to this configuration, it is possible to directly obtain the voltages corresponding to the added strains of the pair of strain gauges by the single Wheatstone bridge circuit.

According to another aspect of the invention, there is provided a press load measuring apparatus for a press machine of 1-point type configured to drive a slide via one connecting rod, the press load measuring apparatus including: a plurality of strain gauges which are respectively attached to a plurality of columns of the press machine to detect strain occurring in the plurality of columns according to a press load acting on the slide, the plurality of strain gauges each being attached along a neutral axis of a plane intersecting with a neutral surface of the respective columns; and a press partial load calculator configured to calculate press partial loads corresponding to the respective columns of the plurality of columns based on the strains detected by the strain gauges attached to the respective columns of the plurality of columns.

According to still another aspect of the invention, since the strain gauges are attached along the neutral axes of the surfaces of the respective columns intersecting the neutral surface, the respective strain gauges can detect strains without being impacted by the bending strains caused by the bending moments. This is because the neutral axes do not expand or contract due to a bending moment. By calculating press partial loads for the respective columns based on the strains detected by the strain gauges attached to the respective columns in this manner, press partial loads with high degree of accuracy without including errors caused by the bending moments are calculated.

In a press load measuring apparatus for a press machine according to a further aspect of the invention, it is preferable that the press load measuring apparatus further includes an adder configured to calculate a total sum of the press partial loads as a press load. Accordingly, a press load with high degree of accuracy without being impacted by the bending moments can be measured.

In a press load measuring apparatus for a press machine according to still another aspect of the invention, it is preferable that the press load measuring apparatus further includes an output section configured to output the press partial loads calculated for the respective columns, or the press partial loads and the press load.

In a press load measuring apparatus for a press machine according to a further aspect of the invention, it is preferable that the press load measuring apparatus further includes an inertial force calculator configured to calculate an inertial force proportional to a product of a mass of the slide and a member connected to the slide and an acceleration in the direction of movement of the slide, and the press partial load calculator eliminates an inertial force acting on the respective columns out of the calculated inertial force from the press partial loads corresponding to the respective columns of the plurality of columns, thereby further calibrating the press partial loads.

In the case of a large-sized press machine having a large mass of the slide or a mold, an inertial force caused by an acceleration of the slide impacts the accuracy of the press load to be measured. According to a further aspect of the invention, the inertial force proportional to the product of the mass of the slide and the member connected to the slide and the acceleration in the direction of movement of the slide is calculated, and the inertial force acting on the respective columns is eliminated from the press partial loads calculated for the respective columns, thereby further calibrating the press partial load and measuring the press load with high degree of accuracy.

According to an aspect of the invention, there is provided a press load measuring method for a press machine of 1-point type configured to drive a slide via one connecting rod, further including:
attaching strain gauges respectively to a plurality of columns of the press machine, the strain gauges detecting strains generated in the respective columns in association with a press load acting on the slide; calculating bending moments acting on the respective columns of the plurality of columns by a bending moment calculator based on an angle formed between a direction of movement of the slide and the connecting rod, and calculating press partial loads corresponding to the respective columns of the plurality of columns respectively by a press partial load calculator, an impact of a bending strain components being eliminated from the press partial loads based on the strains detected by the strain gauges attached to the respective columns of the plurality of columns and the calculated bending moments acting on the respective columns, the impact of the bending strain components caused by the bending moments included in the detected strains.

According to an aspect of the invention, there is provided a press load measuring method for a press machine of 1-point type configured to drive a slide via one connecting rod, further including: attaching a pair of strain gauges to the respective columns of a plurality of columns of the press machine on both surfaces of the respective columns with intermediary of a neutral surface, the pair of strain gauges detecting strains generated in the plurality of columns in association with the press load acting on the slide; adding the strains detected by the pair of strain gauges corresponding to the respective columns of the plurality of columns and calculating press partial loads corresponding to the respective columns of the plurality of columns based on the added strains by a press partial load calculator.

According to an aspect of the invention, there is provided a press load measuring method for a press machine of 1-point type configured to drive a slide via one connecting rod, further including: attaching strain gauges to respective columns of a plurality of columns of the press machine along neutral axes of surfaces intersecting a neutral surface of the respective columns, the strain gauges detecting strains generated in the respective columns in association with a press load acting on the slide; and calculating press partial loads corresponding to the respective columns of the plurality of columns based on the strains detected by the strain gauges attached to the respective columns of the plurality of columns by a press partial load calculator.

In a press load measuring method for a press machine according to a further aspect of the invention, it is preferable that the adder calculates a total sum of the press partial loads as a press load. Accordingly, a press load with high degree of accuracy without being impacted by the bending moments can be measured.

In a press load measuring method for a press machine according to still another aspect of the invention, it is preferable that an output section outputs the press partial loads calculated for the respective columns, or the press partial loads and the press load.

In the press load measuring method for a press machine according to still another aspect of the invention, it is preferable that the method includes: calculating an inertial force proportional to a product of a mass of the slide and a member connected to the slide and an acceleration in the direction of movement of the slide by an inertial force calculator; and eliminating an inertial force acting on the respective columns out of the calculated inertial force from the press partial loads corresponding to the respective columns of the plurality of columns by the press partial load calculator, thereby further calibrating the press partial loads.

In the case of the press machine of 1-point type, the bending moments acts on the respective columns in the region where the slide position is larger than the bottom dead center in accordance with the angle formed between the direction of movement of the slide and the connecting rod. However, according to the invention, the impact of the bending moments acting on the respective columns of the press machine is eliminated and thus the press partial loads corresponding to the respective columns can be measured accurately.

DETAILED DESCRIPTION OF THE PREFERRED EMBODIMENTS

Preferred embodiments of a press load measuring apparatus and method for a press machine according to the invention will now be described in detail with reference to the accompanying drawings.

Figure 1:
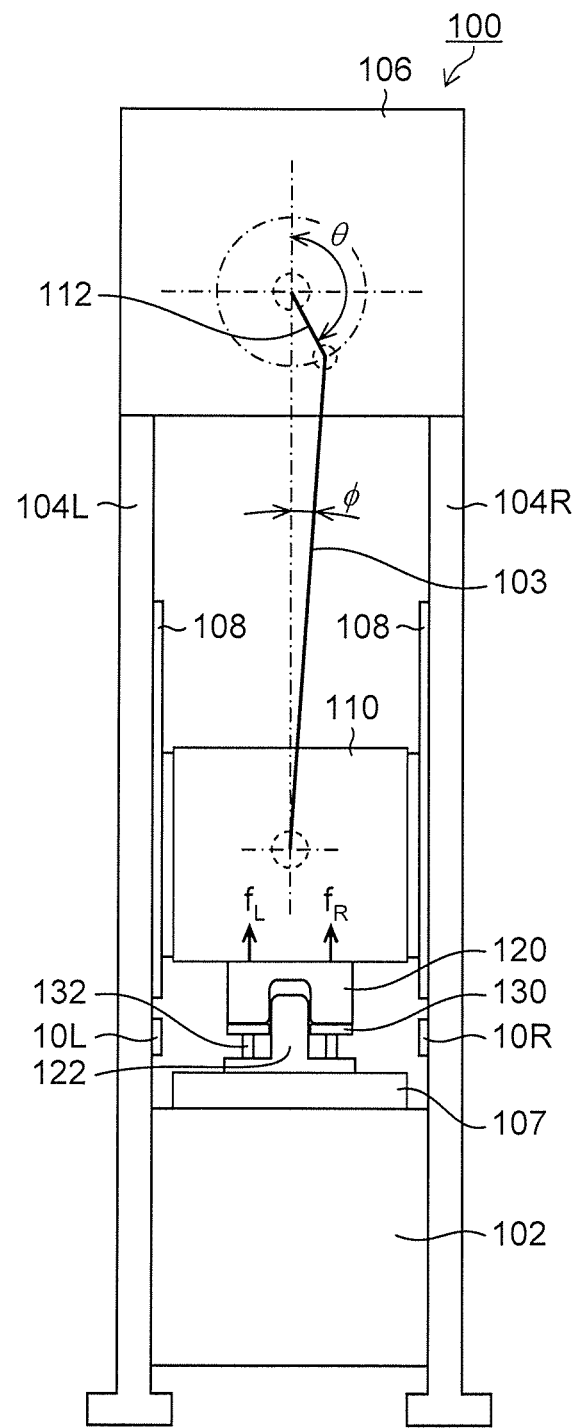
FIG. 1 illustrates an embodiment of a press machine to which a press load measuring apparatus for a press machine according to the invention is applied.

FIG. 1 illustrates an embodiment of a press machine to which a press load measuring apparatus for a press machine according to the invention is applied.

A press machine 100 illustrated in FIG. 1 is a press machine of 1-point type configured to drive the slide 110 via one connecting rod 103, in which a laterally pressing force acts on the slide 110 in accordance with an angle φ formed between a direction of movement of the slide 110 (the vertical direction on FIG. 1) and the connecting rod 103.

The press machine 100 has a frame structure formed by a bed 102, left and right columns 104L and 104R, and a crown 106, which is in laterally symmetry with respect to a center of the machine. Each of the left and right columns 104L and 104R in this example is formed of one plate material.

The slide 110 is guided by guide portions 108 provided on the columns 104L and 104R so as to be movable in the vertical direction (perpendicular direction). The slide 110 is connected to a crank shaft 112 via a connecting rod 103, and a rotational driving force is transmitted to the crank shaft 112 via a driving device, not illustrated (from a flywheel in a driving device of a mechanical type, and from a servo motor in the driving device of a servo type, speed reducer). The slide 110 is moved in the vertical direction in FIG. 1 by the rotation of the crank shaft 112 by the driving device.

Strain gauges 10L and 10R are attached to left and right columns 104L and 104R on inner surfaces of the respective columns 104L and 104R, respectively.

An upper mold 120 is mounted on the slide 110, and a lower mold 122 is mounted on a bolster 107 on the bed 102.

A blank holder (a wrinkle retaining plate) 130 is disposed between the upper mold 120 and the lower mold 122, a lower side thereof is supported by a cushion pad (not illustrated) via a plurality of cushion pins 132, and a blank material (a material) is set on an upper side of the blank holder 130.

[Principle of Press Load Measurement]

Next, the principle of the press load measurement applied to the invention will be described.

First, parameters, signals, and constants used for a press load measurement will be defined as follows.

$f_L$: left press partial load [kN]
$f_R$: right press partial load [kN]
f: total press load [kN]
$F_L$: left press partial load signal [kN]
$F_R$: right press partial load signal [kN]

F: total press load signal [kN]
$F_L'$: left press partial load signal containing an error [kN]
$F_R'$: right press partial load signal containing an error [kN]
F: total press load signal containing an error [kN]
S: slide position signal [mm]
θ: crank angle signal [rad]
φ: an angle signal between a connecting rod with a perpendicular line [rad]
$\varepsilon_{FL}$: strain signal proportional to $F_L$
$\varepsilon_{FR}$: strain signal proportional to $F_R$
$\varepsilon_{ML}$: bending strain signal of the strain gauge mounting part of the left column relating to the lateral load
$\varepsilon_{MR}$: bending strain signal of the strain gauge mounting part of the right column relating to the lateral load
$\varepsilon_{TL}$: left strain signal detected by a strain gauge
$\varepsilon_{TR}$: right strain signal detected by a strain gauge
$K\varepsilon_F$: proportionality constant (load/strain calibration value at the bottom dead center in a rest state).

The strain gauges 10L and 10R detect strains generated in the columns 104L and 104R, respectively, in association with a press load acting on the slide 110.

A relation between strains (strain signals indicating the strains) detected by the strain gauges 10L and 10R and a press load is calibrated by the following manner. In an adjustment phase of the press machine 100, a center portion of the slide is pressed with an upward force having clear value by a hydraulic jack placed on the bolster 107 while the slide 110 is stationary at the bottom dead center. Regarding this force of the hydraulic jack, each of the strain signals detected by the strain gauges 10L and 10R (via the respective strain amplifiers) is calibrated so as to bear even component of the force.

Here, assuming that $K\varepsilon_F$ (kN) is a proportionality constant reaching load values for the respective strain signals of the strain gauges 10L and 10R after the calibration, $\varepsilon_{TL}$ and $\varepsilon_{TR}$ are strain signals detected by the strain gauges 10L and 10R, and $F_L'$ and $F_R'$ (kN) are press partial load signals, the press partial load signals $F_L'$ and $F_R'$ indicating the press load shared by the respective columns 104L and 104R of the related art (hereinafter, referred to as "press partial loads") are expressed generally as [Expression 1] and [Expression 2].

$$F_L' = K\varepsilon_F \cdot \varepsilon_{TL} \quad \text{[Expression 1]}$$

$$F_R' = K\varepsilon_F \cdot \varepsilon_{TR} \quad \text{[Expression 2]}$$

Alternatively, when the strain signal and the load signal are not directly proportional to each other in all load regions, for example, in a calibration phase, $K\varepsilon_F$ is calculated as a variable value for each load region.

The press machine 100 of this example is equipped with a servo die cushion having a maximum capacity of 300 kN. A mold (an upper mold 120 and a lower mold 122) for draw forming a cylindrical product of rotational symmetry was mounted on a center of the machine, and in the state in which a constant die cushion load (setting) 200 kN was applied in the vicinity of the bottom dead center without a material (without performing molding), the crank shaft 112 was reversed between constant two angles, and was swung (pendulum driving) about the bottom dead center by about 14 mm without returning the slide 110 to the top dead center.

FIGS. 2A to 2E are waveform diagrams showing a crank angle signal θ indicating a crank angle, a slide position signal S indicating the position of the slide 110, a die cushion load signal indicating the die cushion load, respective the press partial load signals $F_L'$ and $F_R'$ obtained by using [Expression 1] and [Expression 2], and the angle signal φ (deg) indicating an angle formed between the connecting rod 103 and the perpendicular line when the press machine 100 is driven to make a pendulum movement.

The crank angle signal θ (FIG. 2A) repeats an oscillation in a range of about ±20 degrees with respect to 180 degrees. Accordingly, the slide position signal S (FIG. 2B) oscillates between the bottom dead center (0 mm) and approximately 13.8 mm. The die cushion load signal (FIG. 2C) varies by approximately ±10 kN (±5%) and operates substantially constantly in this range depending on the die cushion load setting 200 kN, an impact generated when the die cushion start (when the slide 110 collides with a cushion pad via the upper mold 120, the blank holder 130, and the cushion pin 132), or an impact of presence of a total gap of the press machine 100 when the crank shaft 112 is reversed.

Figure 2A:
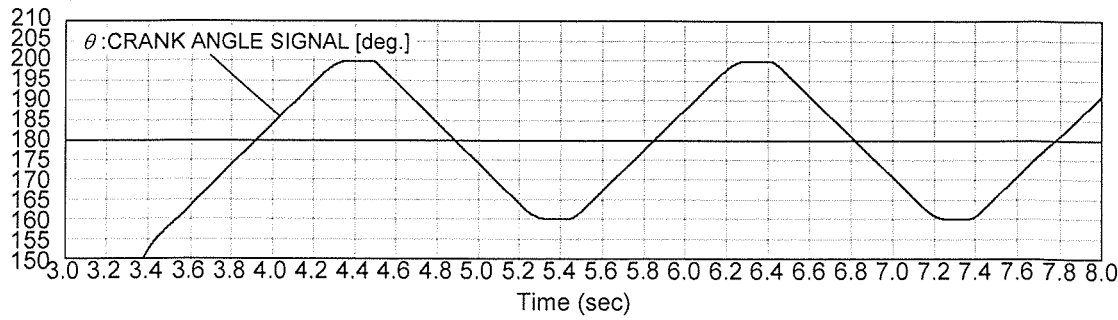
FIG. 2A is a waveform diagram showing a crank angle signal θ indicating a crank angle when the press machine is driven to make a pendulum movement.
Figure 2B:
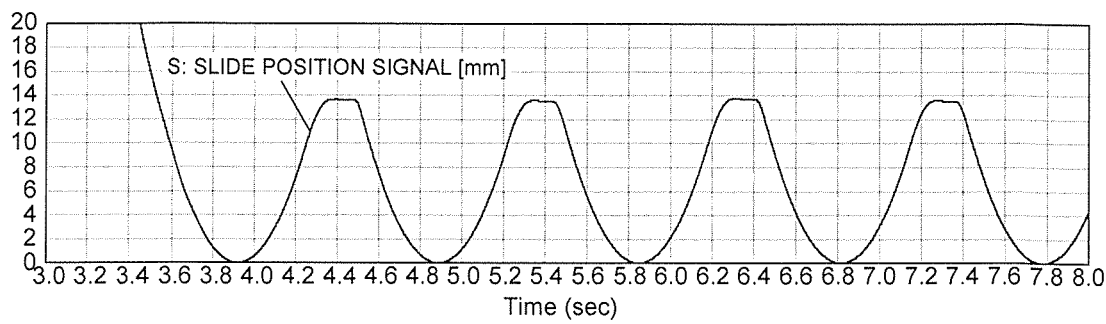
FIG. 2B is a waveform diagram showing a slide position signal S indicating the position of a slide when the press machine is driven to make a pendulum movement.
Figure 2C:
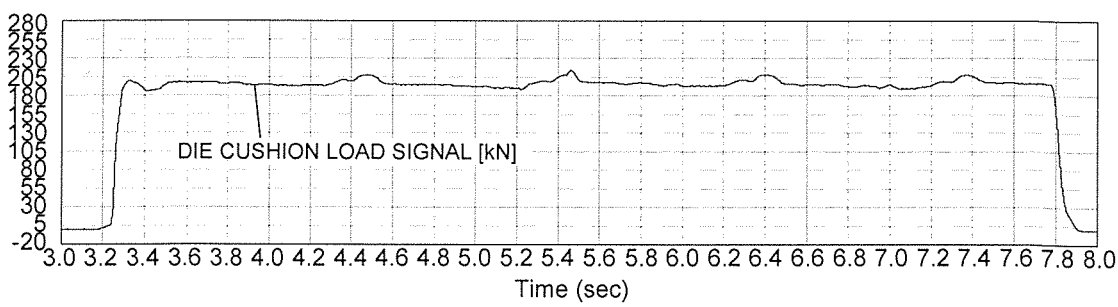
FIG. 2C is a waveform diagram showing a die cushion load signal indicating a die cushion load when the press machine is driven to make a pendulum movement.
Figure 2D:
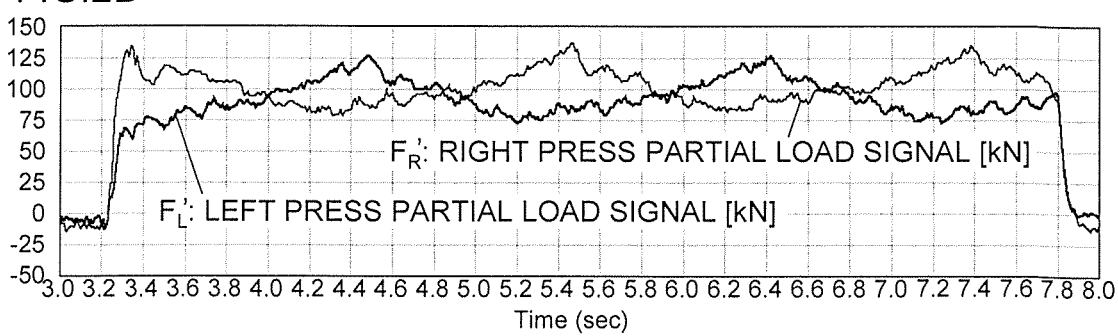
FIG. 2D is a waveform diagram showing the respective press partial load signals $F_L'$ and $F_R'$ when the press machine is driven to make a pendulum movement.
Figure 2E:
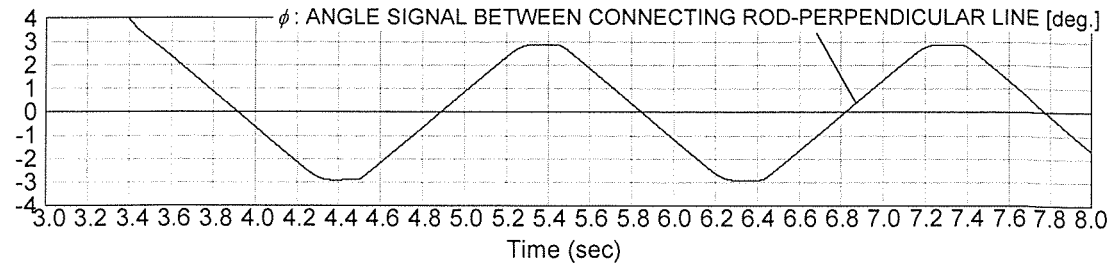
FIG. 2E is a waveform diagram showing an angle signal ϕ (deg) indicating an angle formed between a connecting rod and the perpendicular line when the press machine is driven to make a pendulum movement.

In this manner, although the die cushion load acts substantially constantly, the press partial load signals $F_L'$ and $F_R'$ shown in FIG. 2D keeps in phase with approximately 100 kN at the bottom dead center, but change according to the crank shaft angle θ (whether smaller or larger than 180 degrees) and the slide position S (change by approximately ±30 kN (±30%) with respect to 100 kN), respectively.

The reason why the press partial load signals $F_L'$ and $F_R'$ are changed in this manner will be described in sequence below.

The angle φ (rad) formed between the connecting rod and the perpendicular line can be calculated by using [Expression 3] based on the crank shaft angle θ, a crank radius r, and the connecting rod length l.

$$\phi = \sin^{-1}(r/l \cdot \sin(\pi - \theta)) \quad \text{[Expression 3]}$$

Figure 3A:
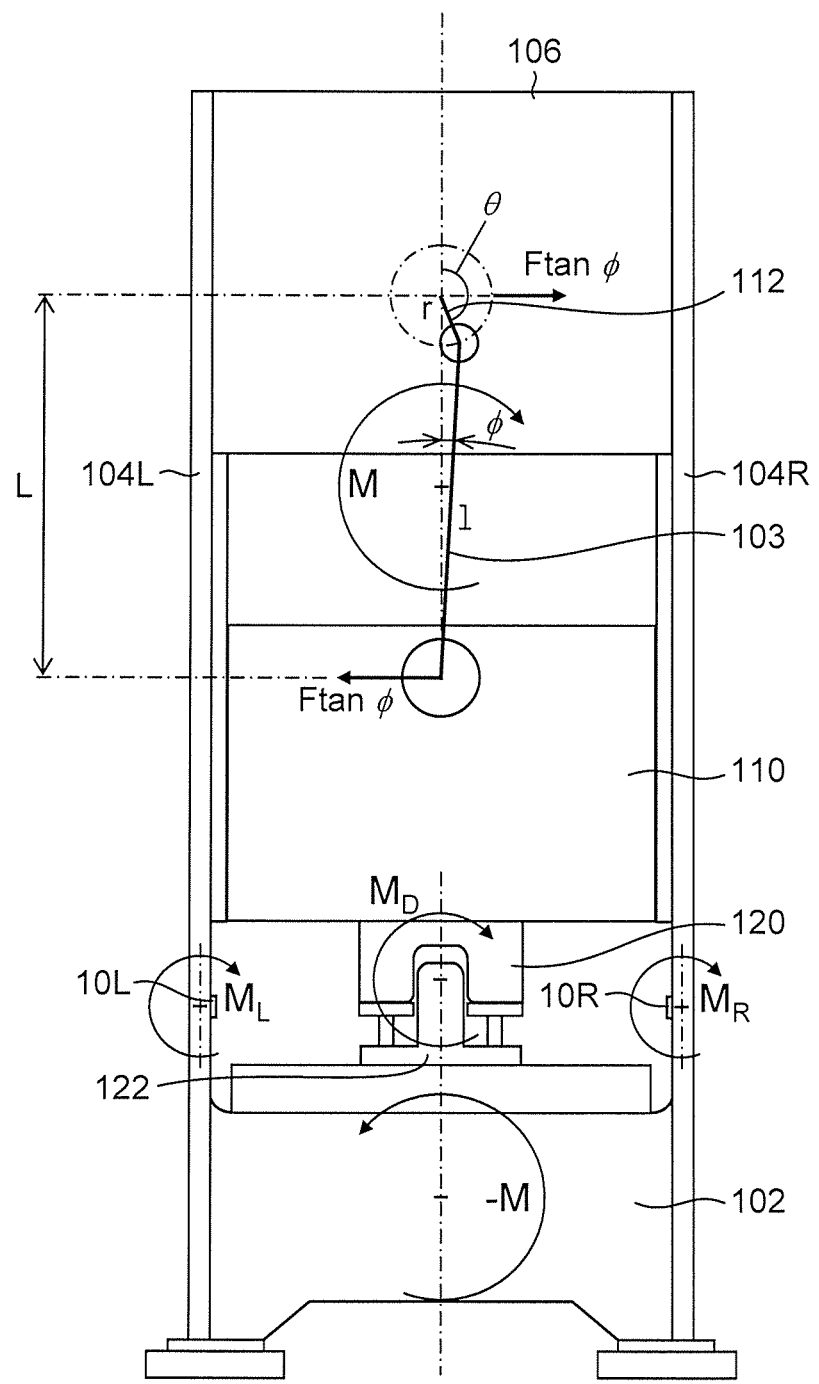
FIG. 3A is a drawing illustrating bending moments $M_L$ and $M_R$ and the like acting on respective columns by a force pressing in a lateral direction (leftward direction)
Figure 3B:
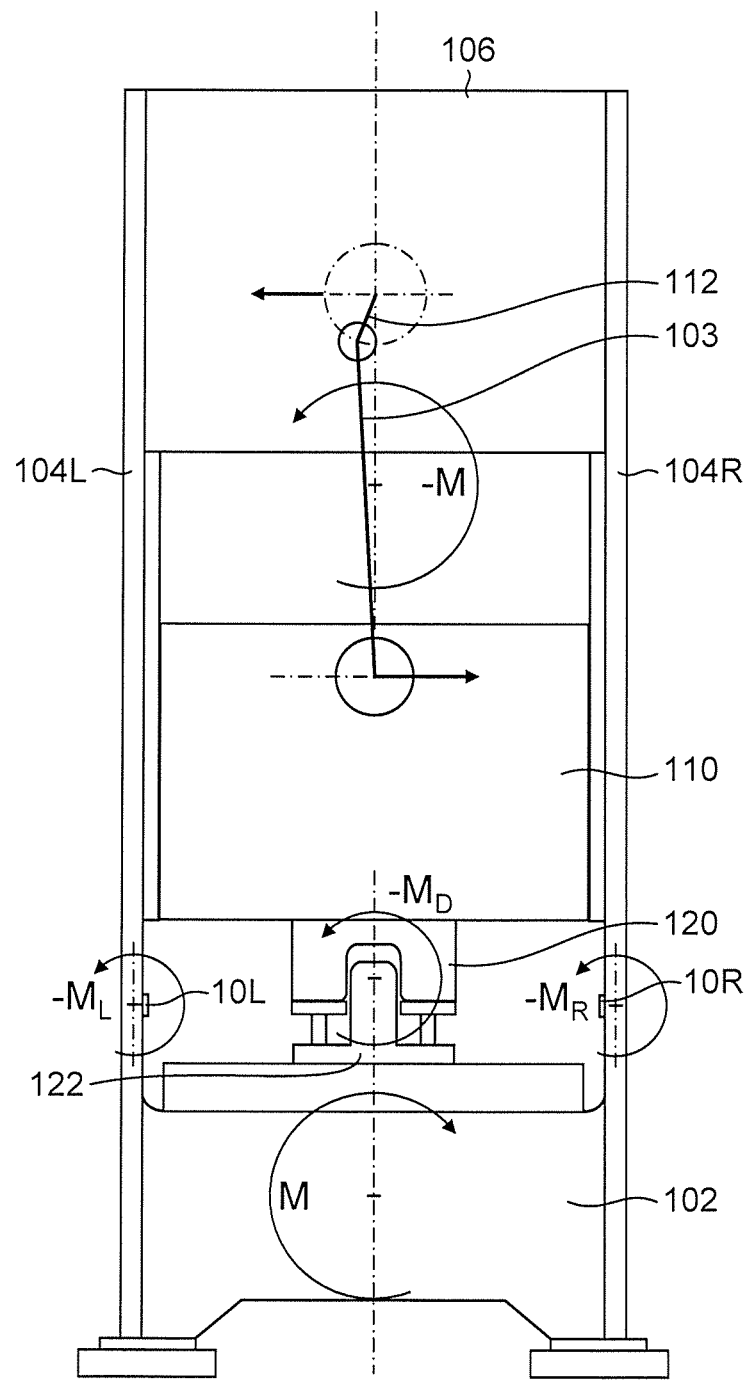
FIG. 3B is a drawing illustrating the bending moments $M_L$ and $M_R$ and the like acting on the respective columns by a force pressing in the lateral direction (rightward direction)

FIGS. 3A and 3B illustrate bending moments $M_L$ and $M_R$ and the like acting on the columns 104L and 104R by a laterally pressing force. Note that FIGS. 3A and 3B illustrate a case where the crank shaft angle θ is smaller than 180 degrees and a case where the crank shaft angle θ is larger than 180 degrees.

Figure 4:
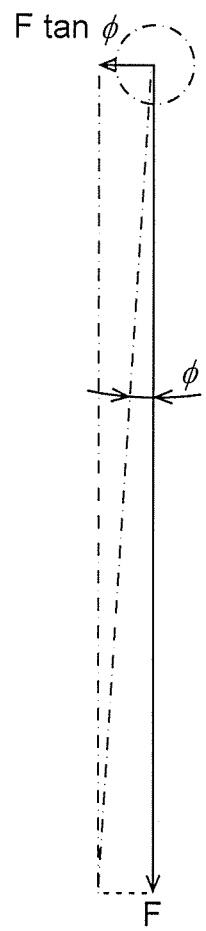
FIG. 4 is a drawing used to explain a force to push the slide laterally.

As illustrated in FIG. 4, assuming that F(kN) is a correct press (total) load applied in the perpendicularly downward of the slide 110, the force $F_{slide}$ (kN) pressing the slide 110 in the lateral direction (hereinafter referred to as "lateral load") according to the angle φ calculated by using [Expression 3] is expressed by the following Expression:

$$F_{slide} = F \cdot \tan \phi \quad \text{[Expression 4]}$$

Also, the bending moment M (kNmm) acting on the frame by the lateral load $F_{slide}$ can be calculated by using [Expression 6] by using the lateral load $F_{slide}$ and the distance L (mm) between the crank shaft center and the connecting rod tip (with respect to a sliding rotational fulcrum) expressed in [Expression 5].

$$L = r \cdot \cos(\pi - \theta) + l \cdot \cos \phi \quad \text{[Expression 5]}$$

$$M = L \cdot F_{slide} \quad \text{[Expression 6]}$$

As shown in FIGS. 3A and 3B, the bending moment M acting on the frame by the press load is generated to bend the entire columns between the crown 106 and the slide 110, and is transmitted through the left and right columns 104L and 104R and the mold, and is cancelled by the bed 102.

As illustrated in FIGS. 3A and 3B, the strain gauges 10L and 10R are attached to the inner surfaces of the left and right columns 104L and 104R of the mold mounting part. The bending moments $M_L$ and MR (kNmm) transmitted respectively to the respective columns 104L and 104R can be expressed by [Expression 7] and [Expression 8], respectively, by using respective share rates (constants) $k_{ml}$ and $k_{mr}$ for the bending moment M expressed in [Expression 6].

$$M_L = k_{ml} \cdot M \qquad \text{[Expression 7]}$$

$$M_R = k_{mr} \cdot M \qquad \text{[Expression 8]}$$

Since the press machine 100 of this example has a frame structure in lateral symmetry with respect to the center of the machine and the mold symmetrical in lateral symmetry with respect to the center of the machine is mounted, the constants $k_{ml}$ and $k_{mr}$ are equal to each other, and also equal to the bending moments $M_L$ and $M_R$. It is preferable that the constants $k_{ml}$ and $k_{mr}$ are determined for the respective the molds (rigidity and mounting balance of the mold).

Figure 5:
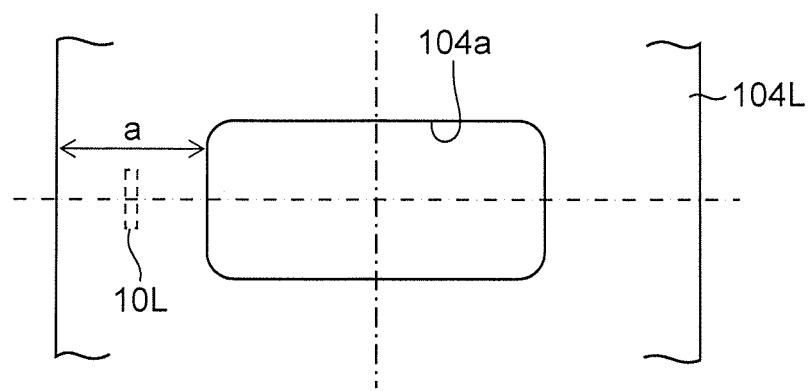
FIG. 5 is a drawing illustrating a side surface of a strain gauge mounting part of the column on the left side.

FIG. 5 illustrates the side surface of the mounting part of the strain gauge 10L of the left column 104L. Note that reference numeral 104a designates an opening formed in the column 104L made of a plate material.

In FIG. 5, assuming that t (mm) is a plate thickness of the mounting part of the strain gauge 10L of the column 104L and a (mm) is the plate width, a cross-sectional area s (mm²) and a cross-sectional secondary moment I (mm⁴) of the mounting part of the column 104L can be expressed by using [Expression 9] and [Expression 10A], respectively. Note that [Expression 9], [Expression 10A], and the like are also established for the right column 104R.

$$S = a \cdot t \qquad \text{[Expression 9]}$$

$$I = (1/12) \cdot a \cdot t3. \qquad \text{[Expression 10A]}$$

Figure 6A:
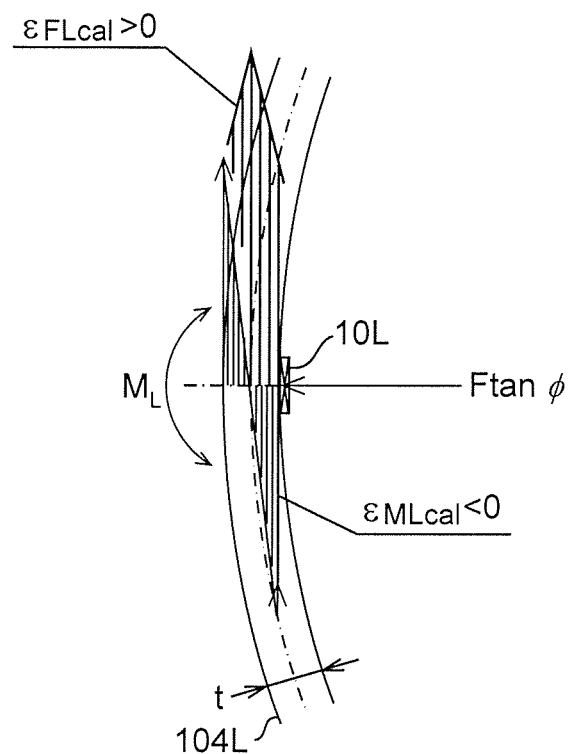
FIG. 6A is a drawing illustrating the distribution of a tensile strain and a bending strain acting on the strain gauge mounting part of the column on the left side.
Figure 6B:
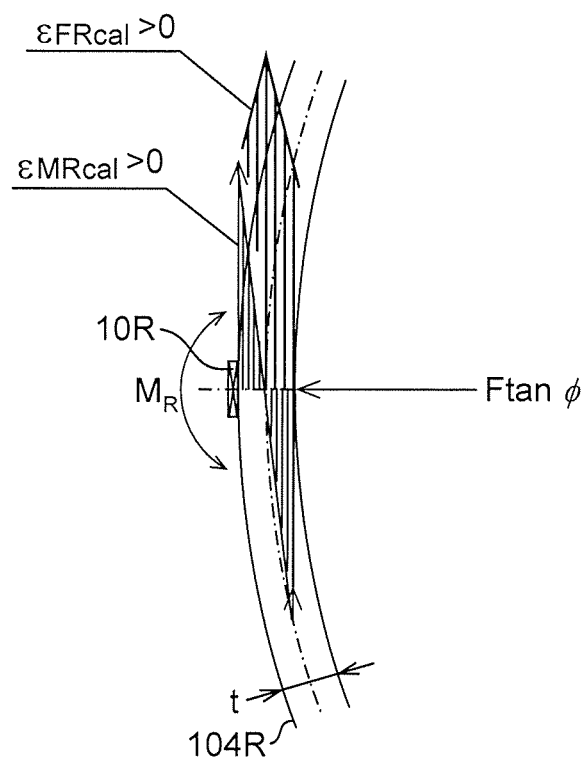
FIG. 6B is a drawing illustrating a distribution of the tensile strain and the bending strain acting on the strain gauge mounting part of the column on the right side.

FIGS. 6A and 6B are drawings illustrating the distribution of the tensile strain and the bending strain acting on the mounting parts of the strain gauges 10L and 10R of the left and right columns 104L and 104R.

It is assumed that E (kN/mm²) is Young's modulus (longitudinal elastic modulus) of columns 104L and 104R (material), and $F_L$ and $F_R$ are correct press partial load signals, and that stresses generated by the press partial loads $F_L$ and $F_R$ are uniformly distributed in the columns 104L and 104R, calculated values $\varepsilon_{FLcal}$ and $\varepsilon_{FRcal}$ of the tensile strains generated in the left and right strain gauge mounting parts by $F_L$ and $F_R$ can be calculated by using [Expression 10B] and [Expression 11].

$$\varepsilon_{FLcal} = F_L/2sE) \qquad \text{[Expression 10B]}$$

$$\varepsilon_{FRcal} = F_R/2sE) \qquad \text{[Expression 11]}$$

At this time, the bending strain $\varepsilon_{MLcal}$ and $\varepsilon_{MRcal}$ acting on the inner surfaces of the left and right columns 104L and 104R generated by the lateral load $F_{slide}$ simultaneously at this time can be expressed by [Expression 12] and [Expression 13], assuming that the bending stresses caused by the bending moments $M_L$ and $M_R$ are uniformly distributed in the width direction of the plate width direction.

$$\varepsilon_{MLcal} = M_L \cdot t/(4EI) \qquad \text{[Expression 12]}$$

$$\varepsilon_{MRcal} = +M_R \cdot t/(4EI) \qquad \text{[Expression 13]}$$

When the strain gauges 10L and 10R are calibrated, the lateral load $F_{slide}$ is 0 (M=($M_L$=$M_R$=) 0) at the bottom dead center of the slide 110, and the bending strain $\varepsilon_{MLcal}$ and the $\varepsilon_{MRcal}$ are not generated in the columns 104L and 104R. Therefore, the strains $\varepsilon_{TL}$ and $\varepsilon_{TR}$ detected from the left and right strain gauges 10L and 10R are equal to the strains $\varepsilon FL$ and $\varepsilon_{FR}$ generated by the correct press partial load signals $F_L$ and $F_R$. Since $\varepsilon_{FL}$ and $\varepsilon_{FR}$ correspond to $\varepsilon_{FLcal}$ and $\varepsilon_{FRcal}$ in calculation (theoretically), the proportionality constants $K\varepsilon_F$ in [Expression 1] and [Expression 2] satisfies $K\varepsilon_F = 2sE$ compared with [Expression 1], [Expression 2], [Expression 10B], and [Expression 11].

$$F_L = 2sE_Y \cdot \varepsilon_{FLcal} \qquad \text{[Expression 14]}$$

$$F_R = 2sE_Y \cdot \varepsilon_{FRcal} \qquad \text{[Expression 15]}$$

However, when the strain gauges 10L and 10R are actually used after the calibration of the proportionality constant $K\varepsilon_F$ of the strain gauges 10L and 10R, the bending strain $\varepsilon_{MLcal}$ and $\varepsilon_{MRcal}$ are generated in the columns 104L and 104R, except for the bottom dead center of the slide 110. Therefore, the press partial load signals (first press partial load signals) $F_L{'}_{cal}$ and $F_R{'}_{cal}$ include errors caused by the impact of the bending strains $\varepsilon_{MLcal}$ and $\varepsilon_{MRcal}$, and can be expressed by the following Expression.

$$F_L{'}_{cal} = 2sE_Y \cdot (\varepsilon_{FLcal} + \varepsilon_{MLcal}) \qquad \text{[Expression 16]}$$

$$F_R{'}_{cal} = 2sE_Y \cdot (\varepsilon_{FRcal} + \varepsilon_{MRcal}) \qquad \text{[Expression 17]}$$

As illustrated in FIGS. 6A and 6B, the bending strain $\varepsilon_{MLcal}$ and $\varepsilon_{MRcal}$ acting on the left and right columns 104L and 104R are 0 in values acting on the centers (neutral axes) of the respective columns 104L and 104R, and the inner surfaces of the curvatures are the maximum values in the compression (−) direction and the outer surfaces of the curvatures are the maximum values in the tension (+) direction.

A compressive strain is applied to the strain gauge mounting part of the left column 104L illustrated in FIG. 6A, and a tensile strain is applied to the strain gauge mounting part of the right column 104R illustrated in FIG. 6B.

In this example, (the mold of in point symmetry is mounted on a center of the machine) and $M_L$ and $M_R$ are equal to each other, the absolute values of the $\varepsilon_{MLcal}$ and the $\varepsilon_{MRcal}$ are equal to each other. Therefore, the following expression is established from [Expression 16] and [Expression 17].

$$F_L{'}_{cal} + F_R{'}_{cal} (=2SE_Y(\varepsilon_{FLcal} + \varepsilon_{FRcal}) = F_L + F_R) = F \qquad \text{[Expression 18]}$$

[Expression 18] indicates that the total of the press partial load signals is a correct press load signal.

Figure 7A:
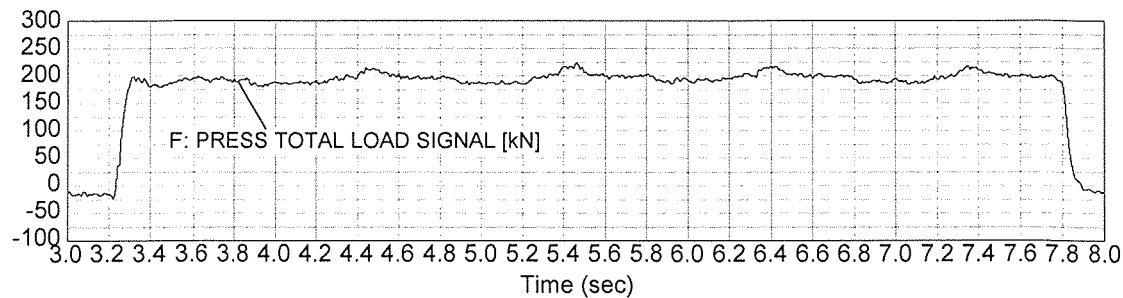
FIG. 7A is a waveform diagram showing a net press (total) load signal F.
Figure 7B:
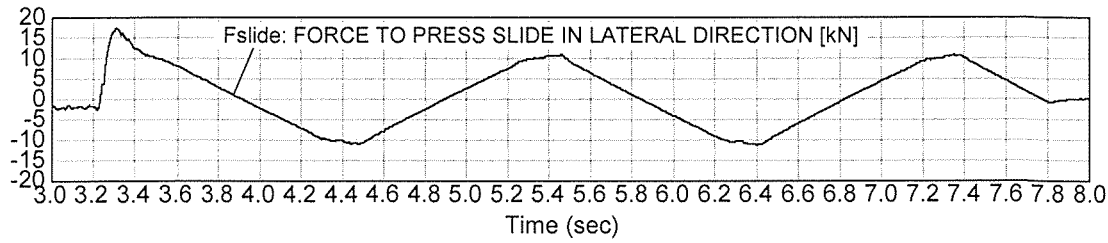
FIG. 7B is a waveform diagram showing the lateral load $F_{slide}$.
Figure 7C:
FIG. 7C is a waveform diagram showing a bending moment M.

FIG. 7A is a waveform diagram showing a net press (total) load signal F ($=F_L{'}+F_R{'}$) calculated by using [Expression 18]. FIG. 7B is a waveform diagram showing the lateral load $F_{slide}$ calculated by using [Expression 4], and FIG. 7C is a waveform diagram showing a bending moment M calculated by using [Expression 6].

Figure 7D:
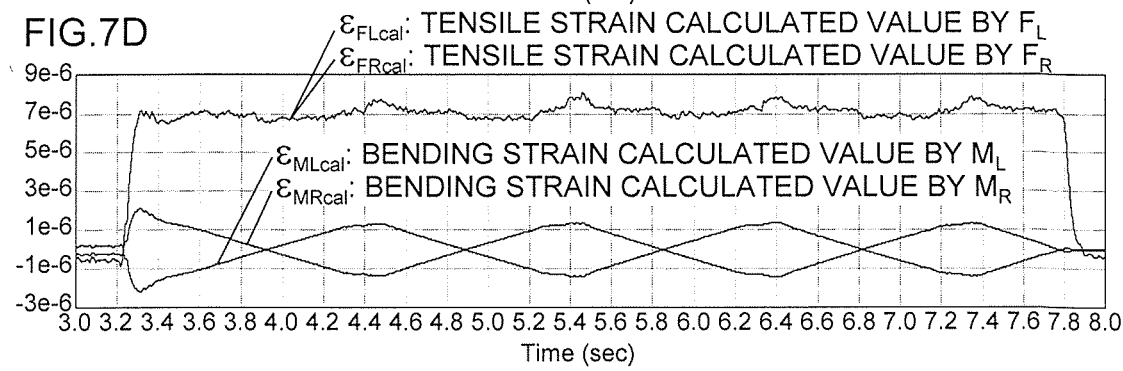
FIG. 7D is a waveform diagram showing calculated values $\varepsilon_{FLcal}$, $\varepsilon_{FRcal}$ of the tensile strain and calculated values $\varepsilon_{MLcal}$, $\varepsilon_{MRcal}$ of the bending strain generated in the strain gauge mounting part.

FIG. 7D is a waveform diagram showing the calculated values $\varepsilon_{FLcal}$, $\varepsilon_{FRcal}$ of the tensile strains and the calculated values $\varepsilon_{MLcal}$, $\varepsilon_{MRcal}$ for the bending strain generated in the strain gauge mounting parts for the columns 104L and 104R.

The calculated values $\varepsilon_{FLcal}$ and $\varepsilon_{FRcal}$ of the tensile strain are calculated values calculated by [Expressions 10] [Expression 10] and [Expression 11] based on the press partial loads $F_L$ and $F_R$, and the calculated values $\varepsilon_{MLcal}$ and $\varepsilon_{MRcal}$ of the bending strain are calculated by using [Expression 12] and [Expression 13] based on the bending moments $M_L$ and $M_R$. In this example, since $F_L$ and $F_R$ are equal to each other, and thus $\varepsilon_{FLcal} = \varepsilon_{FRcal}$ is satisfied.

Figure 7E:
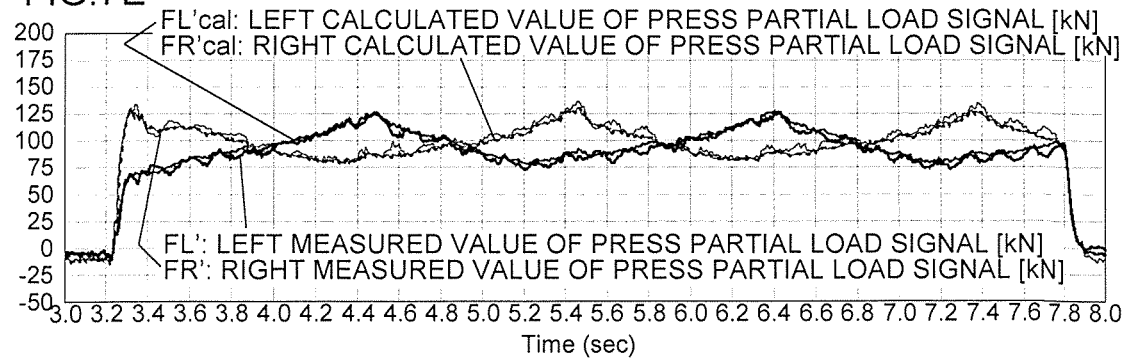
FIG. 7E is a waveform diagram showing a left measurement value $F_L'$ of the press partial load signal, a right measurement value $F_R'$ of the press partial load signal, a left calculated value $F_L'_{cal}$ of the press partial load signal, and a right calculated value $F_R'_{cal}$ of the press partial load signal including errors due to the bending strain.

FIG. 7E is a waveform diagram showing a left measurement value $F_L{'}$ of the press partial load signal, a right measurement value $F_R{'}$ of the press partial load signal, and a left calculated value $F_L{'}_{cal}$ of the press partial load signal, and a right calculated value $F_R{'}_{cal}$ of the press partial load signal including errors due to the bending strain.

$F_L{'}$ and $F_R{'}$ are measurement values calculated by using [Expression 1] and [Expression 2], respectively, and $F_L{'}_{cal}$ and $F_{Rcal}'$ are calculated values calculated by using [Expression 16] and [Expression 17], respectively.

As shown in FIG. 7E, the calculated value and the measurement value of the press partial load signals on the left and right are substantially the same.

In this manner, in the press machine of 1-point type 100, the press partial load signals by the strain gauges 10L and 10R attached to the inner (outer) surface of the left and right columns 104L and 104R included an error corresponding to an impact of the laterally pressing force applied to push the slide 110 by the press load. At least, the angle ($\phi$) between the perpendicular line and the connecting rod 103, and an error corresponding to the impact of the press load signal (F) were included. This error causes the user trying to inspect the relationship between molding properties and the press load values confused and to defeat the press machine manufacturer's credit.

[First Embodiment of Press Load Measuring Apparatus of Press Machine]

Figure 8:
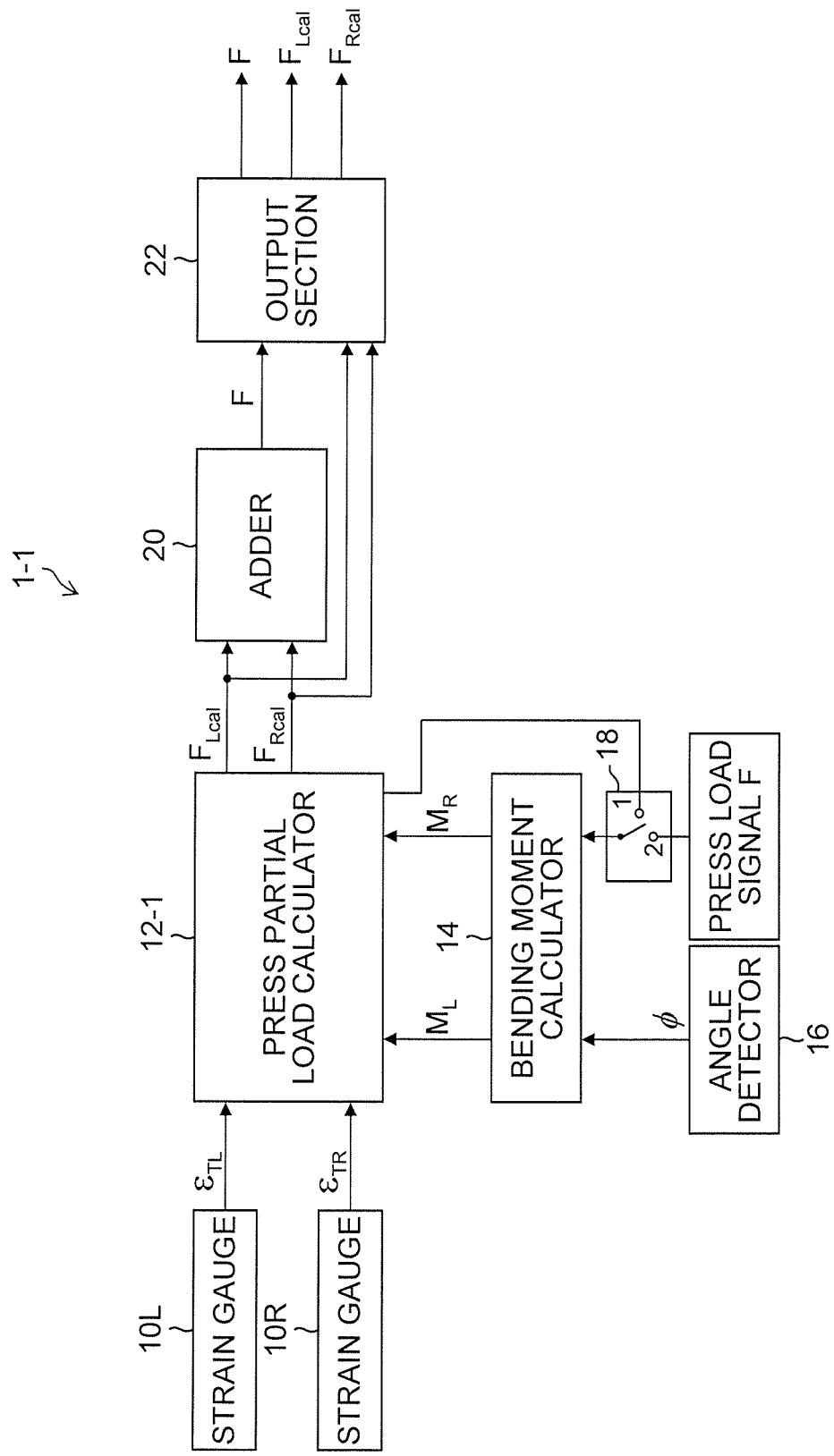
FIG. 8 is a block diagram illustrating a first embodiment of the press load measuring apparatus of a press machine.

FIG. 8 is a block diagram illustrating the first embodiment of the press load measuring apparatus of a press machine.

A press load measuring apparatus 1-1 of the press machine of the first embodiment illustrated in FIG. 8 is configured to eliminate the impact of the bending strain components included in the strains (strain signals) detected by the respective strain gauges attached to the respective columns, to accurately measure the press partial loads corresponding to the respective columns, and to mainly include the strain gauges 10L and 10R, a press partial load calculator 12-1, a bending moment calculator 14, an adder 20, and an output section 22.

The strain gauges 10L and 10R are attached to the left and right columns 104L and 104R, and outputs strain signals $\varepsilon_{TL}$ and $\varepsilon_{TR}$ corresponding to strains of the mounting surfaces to the press partial load calculator 12-1.

To other inputs of the press partial load calculator 12-1, signals indicative of bending moments $M_L$ and $M_R$ acting on the respective columns 104L and 104R are applied from bending moment calculator 14.

An angle signal $\phi$ indicating an angle formed between the connecting rod 103 and the perpendicular line detected from an angle detector 16 and a press load signal F indicating a rough total press load signal through a selector 18 are added to the bending moment calculator 14, and the bending moment calculator 14 calculates bending moments $M_L$ and $M_R$ transmitted to the respective columns 104L and 104R expressed in [Expression 7] and [Expression 8], respectively.

The press load signal F in this phase is roughly calculated, for example, by the press partial load calculator 12-1, based on the strain signals $\varepsilon_{TL}$ and $\varepsilon_{TR}$, or by considering the position of mold installation, or when the slide 110 is a driving device of a servo type, for example, is roughly calculated from the total drive torque (total drive current), the reduction ratio, and the crank angle signal $\theta$ of the servo motor.

The selector 18 selects a press load signal F applied to an input terminal 1 or a press load signal F applied to an input terminal 2, and outputs the selected press load signal F to the bending moment calculator 14. When using the press load signal F roughly calculated by the press partial load calculator 12-1, the selector 18 selects the press load signal F applied to the input terminal 1, and when using the press load signal F (for example, the press load signal F roughly calculated from the total drive torque, the reduction ratio, and the crank angle signal $\theta$ of the servo motor) calculated by the other devices is used, the selector 18 selects the press load signal F applied to the input terminal 2.

Here, the bending moment M in [Expression 7] and [Expression 8] can be calculated by using [Expression 6], and the lateral load $F_{slide}$ and the distance L in [Expression 6] can be calculated by using [Expression 4] and [Expression 5], and the press load signal F in [Expression 4] can be calculated based on [Expression 18].

Further, the angle detector 16 calculates an angle signal $\phi$ indicating an angle formed between the connecting rod 103 and the perpendicular line by using [Expression 3] based on the crank shaft angle signal $\theta$ input from an encoder (not illustrated) for detecting the angle of the crank shaft 112. The angle signal $\phi$ is used when the lateral load $F_{slide}$ is calculated by using [Expression 6].

The press partial load calculator 12-1 (first press partial load calculator) calculates the left measurement value $F_L'$ and the right measurement value $F_R'$ of the press partial load signal (first press partial load signal) according to [Expression 1] and [Expression 2] based on the strain signals $\varepsilon_{TL}$ and $\varepsilon_{TR}$ input from the strain gauges 10L and 10R. The left measurement value $F_L'$ and the right measurement value $F_R'$ include errors caused by the bending strain $\varepsilon_{MLcal}$ and the $\varepsilon_{MRcal}$, as shown in FIG. 7E.

Therefore, the press partial load calculator 12-1 (error calculator) calculates the bending strain calculated values $\varepsilon_{MLcal}$, $\varepsilon_{MRcal}$ acting on the inner surfaces of the left and right columns 104L and 104R based on bending moments $M_L$ and $M_R$ input from the bending moment calculator 14 (see [Expression 12], [Expression 13]), and calculates errors due to bending moments $M_L$ and $M_R$ based on the bending strain calculated values $\varepsilon_{MLcal}$ and $\varepsilon_{MRcal}$ and the proportionality constant.

The press partial load calculator 12-1 eliminates a press partial load error based on the bending strain calculated value $\varepsilon_{MLcal}$ and $\varepsilon_{MRcal}$ from the left measurement value $F_L'$ and the right measurement value $F_R'$ of the press partial load signal including errors, thereby calculating the left calculated value $F_{Lcal}$ and the right calculated value $F_{Rcal}$ of the correct press partial load signal.

In other words, the left calculated value $F_{Lcal}$ and the right calculated value $F_{Rcal}$ of the correct press partial load signal can be calculated by the following Expression.

$$F_{Lcal}=F_L'-2SE_Y \cdot \varepsilon_{MLcal}=K\varepsilon_F \cdot \varepsilon_{TL}-2SE \cdot \varepsilon_{MLcal} \qquad \text{[Expression 19]}$$

$$F_{Rcal}=F_R'-2SE_Y \cdot \varepsilon_{MRcal}=K\varepsilon_F \cdot \varepsilon_{TR}-2SE \cdot \varepsilon_{MRcal} \qquad \text{[Expression 20]}$$

The press partial load calculator 12-1 subtracts the press partial load error ($2SE \cdot \varepsilon_{MLcal}$, $2SE \cdot \varepsilon_{MRcal}$) from the left measurement value $F_L'$ and the right measurement value $F_R'$ including errors based on the bending strains respectively as expressed in [Expression 19] and [Expression 20], and calculates the left calculated value $F_{Lcal}$ and the right calculated value $F_{Rcal}$ of the correct press partial load signal.

Figure 9:
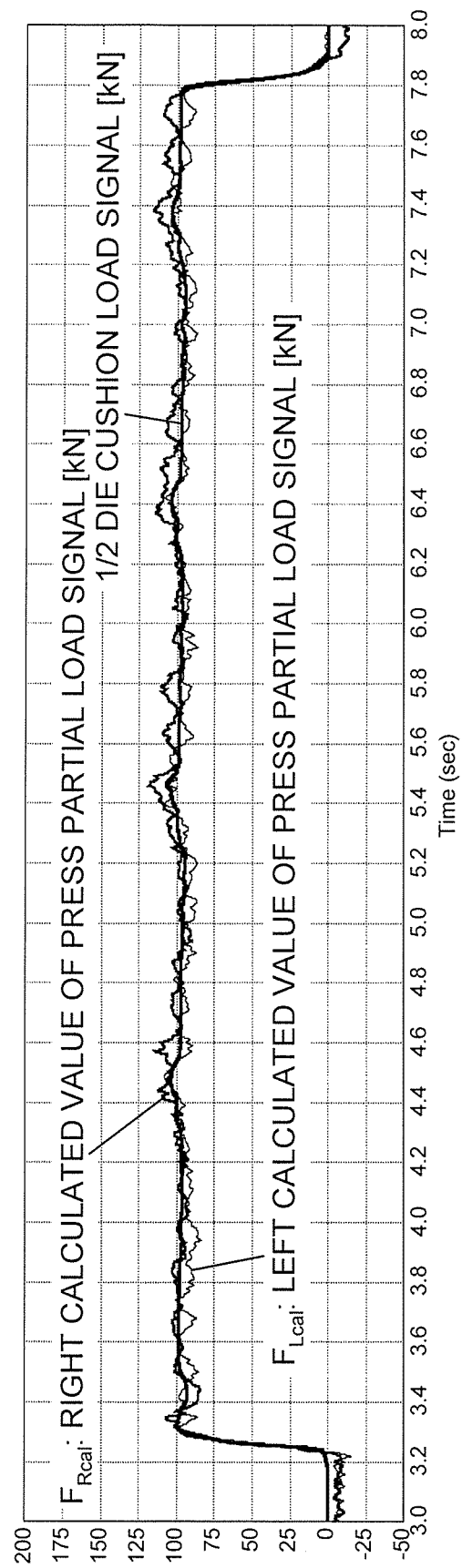
FIG. 9 is a waveform diagram showing a left calculated value $F_{Lcal}$ and a right calculated value $F_{Rcal}$ of a correct press partial load signal calculated by the press partial load calculator, and a press partial loads (½ the die cushion load) acting on the slide.

FIG. 9 is a waveform diagram showing the left calculated value $F_{Lcal}$, the right calculated value $F_{Rcal}$ calculated by the press partial load calculator 12-1, and the press partial load (½ of the die cushion load) acting on the slide 110 of the correct press partial load signal.

As shown in FIG. 9, the left calculated value and the right calculated value of the correct press partial load signal are substantially the same as a half the press load acting on the slide 110.

By providing such a correct press partial load signal to the user, it is possible to support the user trying to inspect the relationship between the molding properties and the press partial load value can be supported so that the press machine (dedicated) manufacturer's credit can be maintained.

The left calculated value $F_{Lcal}$ and the right calculated value $F_{Rcal}$ of the press partial load signal calculated by the press partial load calculator 12-1 are output to the adder 20 and the output section 22, respectively.

The adder 20 adds the left calculated value $F_{Lcal}$ and the right calculated value $F_{Rcal}$ of the press partial load signals to output the sum (total) of the press partial load signal to the output section 22 as the press load signal F.

The output section 22 outputs the press load signal F, the left calculated value $F_{Lcal}$ and the right calculated value $F_{Rcal}$ of the press partial load signals to a monitor device, a printer, a storage device, and the like, not illustrated, so that the correct press partial load signals can be provided to the user.

Note that the press partial load calculator 12-1 calculates the left measurement value $F_L'$ and the right measurement value $F_R'$ of the press partial load signals including errors as expressed in [Expression 19] and [Expression 20], and subtracts the press partial load errors ($2SE·\varepsilon_{MLcal}$, $2SE·\varepsilon_{MRcal}$) due to the bending strains from the left measurement value $F_L'$ and the right measurement value $F_R'$ to calculate the left calculated value $F_{Lcal}$ and the right calculated value $F_{Rcal}$ of the correct press partial load signal. However, the invention is not limited thereto, and the press partial load calculator 12-1 may be configured to correct the errors caused by the bending strains included in the strain signals $\varepsilon_{TL}$ and $\varepsilon_{TR}$ and calculate the left calculated value $F_{Lcal}$ and the right calculated value $F_{Rcal}$ of the correct press partial load signal based on the strain signals $\varepsilon_{TL}$ and $\varepsilon_{TR}$ after the calibration.

In other words, the press partial load calculator 12-1 may include a bending strain calculator configured to calculate the bending strain calculated values $\varepsilon_{MLcal}$ and $\varepsilon_{MRcal}$ by using [Expression 12] and [Expression 13] based on the bending moments $M_L$ and $M_R$ acting on the respective columns 104L and 104R, and a strain calculating unit configured to eliminate the bending strain calculated values $\varepsilon_{MLcal}$ and $\varepsilon_{MRcal}$ calculated for the respective columns from the strain signals $\varepsilon_{TL}$ and $\varepsilon_{TR}$ detected by the strain gauges 10L and 10R to calculate the calibrated strain signals, so that the press partial load calculator 12-1 generates the strain signals $\varepsilon_{TL}$ and $\varepsilon_{TR}$ after the calibration having the errors caused by the bending strains eliminated and calculates the left calculated value $F_{Lcal}$ and the right calculated value $F_{Rcal}$ of the correct press partial load signals based on the generated strain signals.

[Impact of Inertial Force Such as Slide]

When the slide of the press machine is accelerated or decelerated, due to an impact of an inertial force of the slide or the like, the correct press partial load signals cannot be measured, especially, and in the case of a large press machine having a large mass of the slide or the like, the impact of the inertial force of the slide or the like (slide inertial force) appears remarkably.

Figure 10:
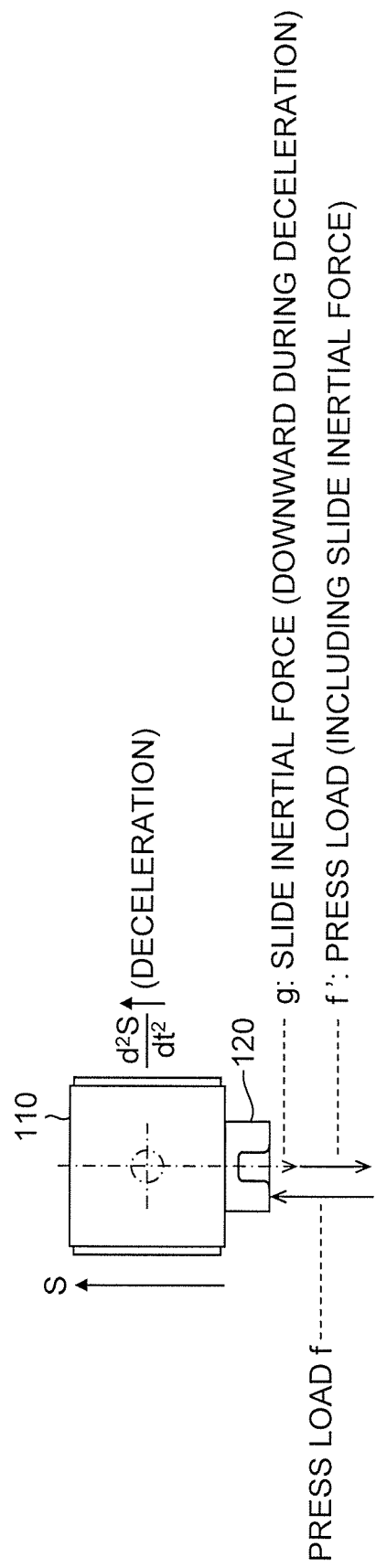
FIG. 10 is a drawing used to explain a relationship between the press load acting on the slide and the slide inertial force.

FIG. 10 is a drawing used to explain a relationship between the press load acting on the slide 110 and the slide inertial force.

In FIG. 10, assuming that Ma (kg) is a mass of the member such as the slide 110 and the upper mold 120 connected to the slide 110, $\alpha$ ($=d^2S/dt^2$) is an increasing acceleration, and a slide inertial force signal G (kN) is a product of the mass Ma and the acceleration $\alpha$ with an inverted sign, the slide inertial force signal G can be expressed by the following expression.

$$G = -Ma \cdot \alpha \cdot 10^{-6} = -Ma \cdot (d^2S/dt^2) \cdot 10^{-6} \qquad \text{[Expression 21]}$$

Assuming that f1 and f2 (kN) are the correct press partial loads, f (=f1+f2) is the correct press load, and g(kN) is the slide inertial force, the press partial loads including the slide inertial force g are $f_1'$ and $f_2'$ (kN), and the press load including the slide inertial force g is $f'(=f_1'+f_2'=f-g)$.

In other words, in the press machine, a part of the press load is borne by the sliding inertial force g, and the balance is borne by the driving force (the force of driving the slide from the flywheel in the case of the mechanical type and from the servo motor in the case of the servo type via the speed reducer or the crank mechanism) $f'(=f_1'+f_2')$ of the slide 110. That is, f' is smaller than f by a smaller amount than g.

In a large press machine, in the case of the large-sized press machine where the mass Ma, such as a slide, is large, for example 90000 kg (approximately 100 t), the sliding inertial force g cannot be ignored (should not be ignored).

Assuming that the impact of the sliding inertial force g on the left and right columns 104L and 104R is equally exerted, the left calculated value $F_{Lcal}$ and the right calculated value $F_{Rcal}$ of the correct press partial load signal can be expressed by the following expression by subtracting G/2, which is half the slide inertial force signal G calculated by using [Expression 21], from [Expression 19] and [Expression 20].

$$F_{Lcal} = K\varepsilon_F \cdot \varepsilon_{TL} - 2SE_Y \cdot \varepsilon_{MLcal} - G/2 \qquad \text{[Expression 22]}$$

$$F_{Rcal} = K\varepsilon_F \cdot \varepsilon_{TR} - 2SE_Y \cdot \varepsilon_{MRcal} - G/2 \qquad \text{[Expression 23]}$$

Figure 11:
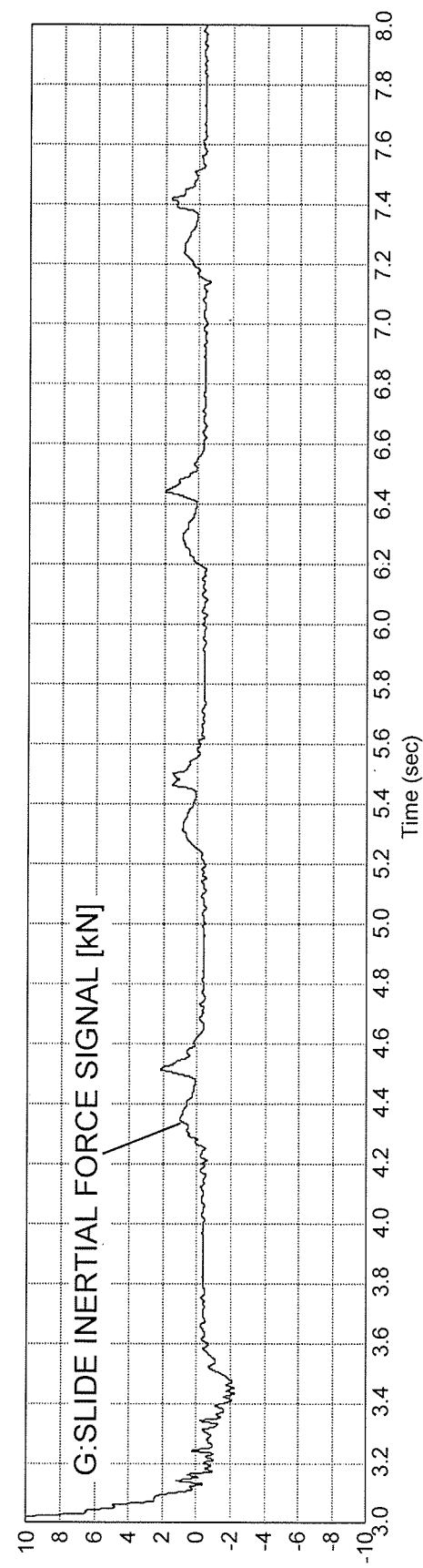
FIG. 11 is a waveform diagram showing a slide inertial force signal G in this example.

FIG. 11 is a waveform diagram showing the slide inertial force signal G in the present example. Since the slide inertial force signal G is directed perpendicularly downward during deceleration of the slide, the left calculated value $F_{Lcal}$ and the right calculated value $F_{Rcal}$ of the press partial load signal calculated by using [Expression 22] and [Expression 23] during deceleration of the slide are larger than the left calculated value $F_{Lcal}$ and the right calculated value $F_{Rcal}$ of the press partial load signals calculated by using [Expression 19] and [Expression 20].

Regarding the slide inertial force signal G shown in FIG. 11, since the press machine is small, the mass of the slide or the like is small, and the acceleration in the vicinity of the bottom dead center (speed change) is small, the slide inertial force signal G(G/2) included in the left and right press partial load signals is about 1% of the right and left press partial load signals shown in FIG. 9, and is not an extent to impact the press partial load signal. However, in the case of the press machine of a large size and of the press machine of 1-point type, the correction based on the slide inertial force signal G according to [Expression 22] and [Expression 23] is effective.

[Modified Example of First Embodiment of Press Load Measuring Apparatus of Press Machine]

Figure 12:
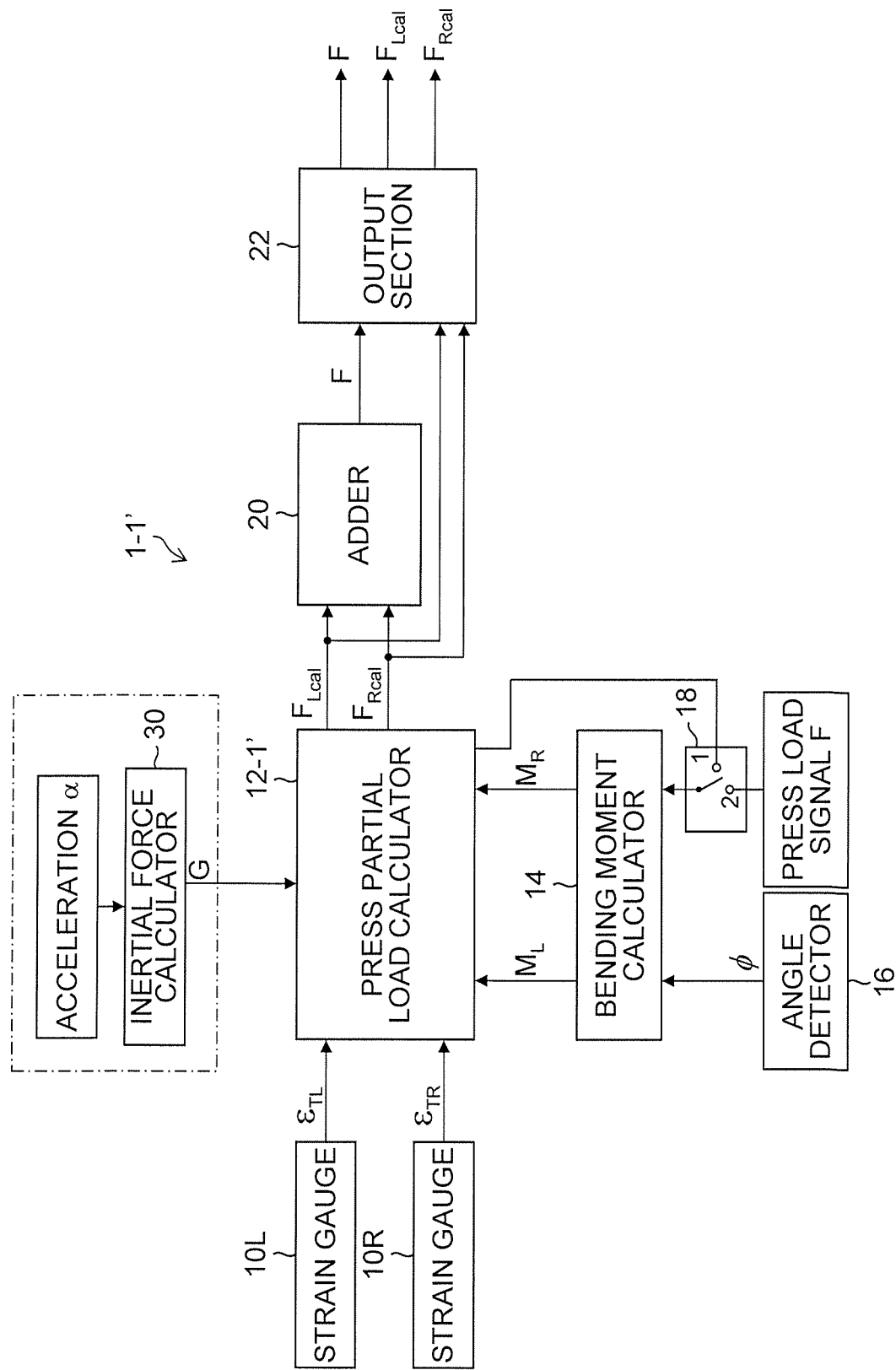
FIG. 12 is a block diagram illustrating a modified example of the first embodiment of the press load measuring apparatus of a press machine.

FIG. 12 is a block diagram illustrating a modified example of the first embodiment of the press load measuring apparatus of a press machine. Note that in FIG. 12, parts common to the press load measuring apparatus 1-1 of the press machine of the first embodiment illustrated in FIG. 8 are designated by the same reference numerals, and detailed description thereof will be omitted.

The press load measuring apparatus 1-1' of the press machine according to the modified example of the first embodiment illustrated in FIG. 12 is different from the press load measuring apparatus 1-1 of the press machine of the first embodiment illustrated in FIG. 8 mainly in that an inertial force calculator 30 is added.

The inertial force calculator 30 calculates the inertial force signal G by using [Expression 21] based on the acceleration α of the slide 110. The acceleration α can be obtained by differentiating the slide position signal S two times. Although the mass Ma may be a preset value, when the upper mold 120 to be mounted on the slide 110 is replaced, it is preferable that the mass Ma is set by the mass of the upper mold that has been exchanged.

The press partial load calculator 12-1' calculates the left calculated value $F_{Lcal}$ and the right calculated value $F_{Rcal}$ of the correct press partial load signal based on [Expression 22] and [Expression 23]. In other words, the press partial load calculator 12-1' is different from the press partial load calculator 12-1 of the first embodiment in that correction by the slide inertial force signal G is performed.

[Second Embodiment of Press Load Measuring Apparatus of Press Machine]

Figure 13:
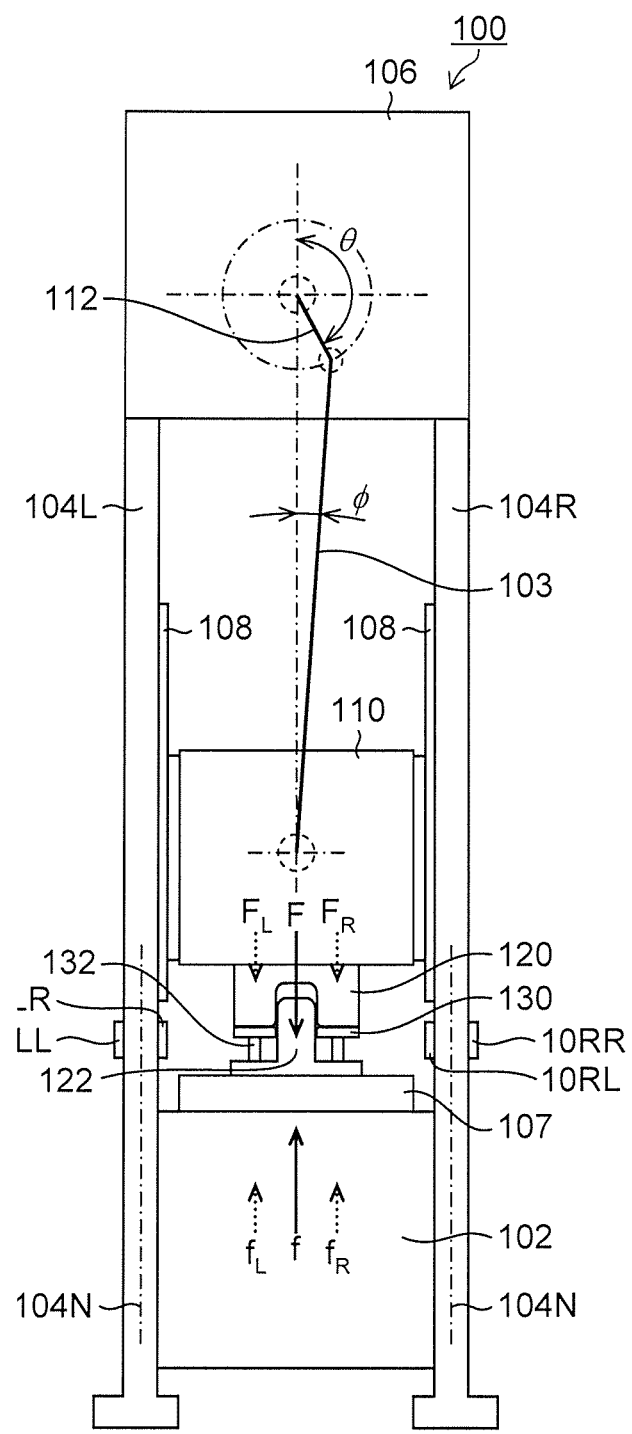
FIG. 13 is a drawing illustrating the same press machine as that illustrated in FIG. 1, a specifically illustrating a case where one pair each of the strain gauges are attached to the left and right columns of the press machine.

FIG. 13 is a drawing illustrating the press machine 100 identical to the press machine 100 illustrated in FIG. 1, specifically illustrating a plurality of pairs (two pairs in this example) of strain gauges are attached to a plurality (two in this example) of columns 104L and 104R of a press machine 100.

As illustrated in FIG. 13, a pair of strain gauges 10LL and 10LR on the left side are attached to both sides of a neutral surface (neutral axis) 104N of a left column 104L, and a pair of strain gauges 10RL and 10RR on the right side are attached to both surfaces of a neutral axis 104N of a right column 104R.

Figure 14:
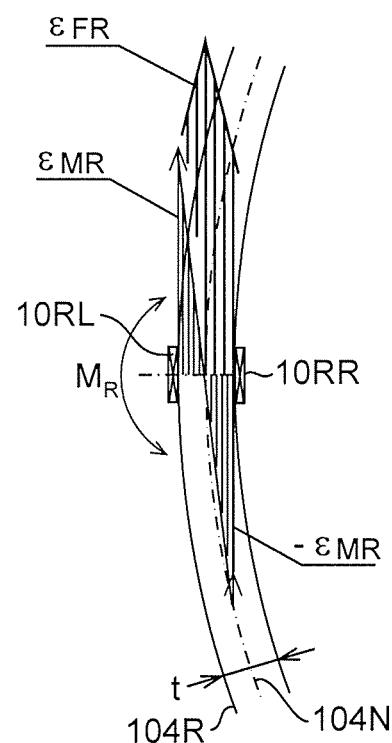
FIG. 14 is a drawing illustrating a distribution of a tensile strain ($\varepsilon_{FR}$) and a bending strain ($\varepsilon_{MR}$, $-\varepsilon_{MR}$) in the strain gauge mounting part of the column on the right side.

FIG. 14 illustrates the distribution of the tensile strain ($\varepsilon_{FR}$) and the bending strains ($\varepsilon_{MR}$-$\varepsilon_{MR}$) in the strain gauge mounting parts of the column 104 R on the right side.

Assuming that $\varepsilon_{FL}$ and $\varepsilon_{FR}$ are the tensile strains generated in the strain gauge mounting parts of the left and right columns 104L and 104R by the left press partial load signal $F_L$ and the right press partial load signal $F_R$, and $\varepsilon_{ML}$, and $\varepsilon_{MR}$ are respectively absolute values of the bending strains generated in the strain gauge mounting parts of the left and right columns 104L and 104R by at least the press load signal F and the angle φ formed between connecting rod 103 and the perpendicular line, the strain signals $\varepsilon_{TLL}$ and $\varepsilon_{TLR}$ detected from the pair of strain gauges 10LL and 10LR on the left side and strain signals $\varepsilon_{TRL}$ and $\varepsilon_{TRR}$ detected from the pair of strain gauges 10RL and 10RR on the right side can be expressed by the following expression.

$$\varepsilon_{TLL}=\varepsilon_{FL}+\varepsilon_{ML} \quad \text{[Expression 24]}$$

$$\varepsilon_{TLR}=\varepsilon_{FL}-\varepsilon_{ML} \quad \text{[Expression 25]}$$

$$\varepsilon_{TRL}=\varepsilon_{FR}+\varepsilon_{MR} \quad \text{[Expression 26]}$$

$$\varepsilon_{TRR}=\varepsilon_{FR}-\varepsilon_{MR} \quad \text{[Expression 27]}$$

Here, when [Expression 24] and [Expression 25] relating to the column 104L on the left side are added and [Expression 26] and the [Expression 27] relating to the column 104R on the right side are added, the following expressions is obtained.

$$\varepsilon_{TLL}+\varepsilon_{TLR}=(\varepsilon_{FL}+\varepsilon_{ML})+(\varepsilon_{FL}-\varepsilon_{ML})=2\cdot\varepsilon_{FL} \quad \text{[Expression 28]}$$

$$\varepsilon_{TRL}+\varepsilon_{TRR}=(\varepsilon_{FR}+\varepsilon_{ML})+(\varepsilon_{FR}-\varepsilon_{ML})=2\cdot\varepsilon_{FR} \quad \text{[Expression 29]}$$

[Expression 28] and [Expression 29] mean that when the strain signals detected by the pair of strain gauges attached to each of the left and right respective columns are added, the bending strain is canceled out.

Therefore, the correct left press partial load signal $F_L$ and the correct right press partial load signal $F_R$ can be expressed by the following Expression.

$$F_L=K\varepsilon_F\cdot(\varepsilon_{TLL}+\varepsilon_{TLR})/2 \quad \text{[Expression 30]}$$

$$F_R=K\varepsilon_F\cdot(\varepsilon_{TRL}+\varepsilon_{TRR})/2 \quad \text{[Expression 31]}$$

However, $K\varepsilon_F$ is a proportionality constant reaching the load values for the respective strain signals after the calibration of the respective strain gauges obtained when pressing a center portion of the slide upward by a hydraulic jack placed on the bolster 107 and calibrating respective strain signals detected from the strain gauges (via the respective strain amplifiers) against the pressing force (having a clear value) so as to bear even component of force while the slide 110 is stationary at the bottom dead center in an adjustment phase of the press machine.

Figure 15:
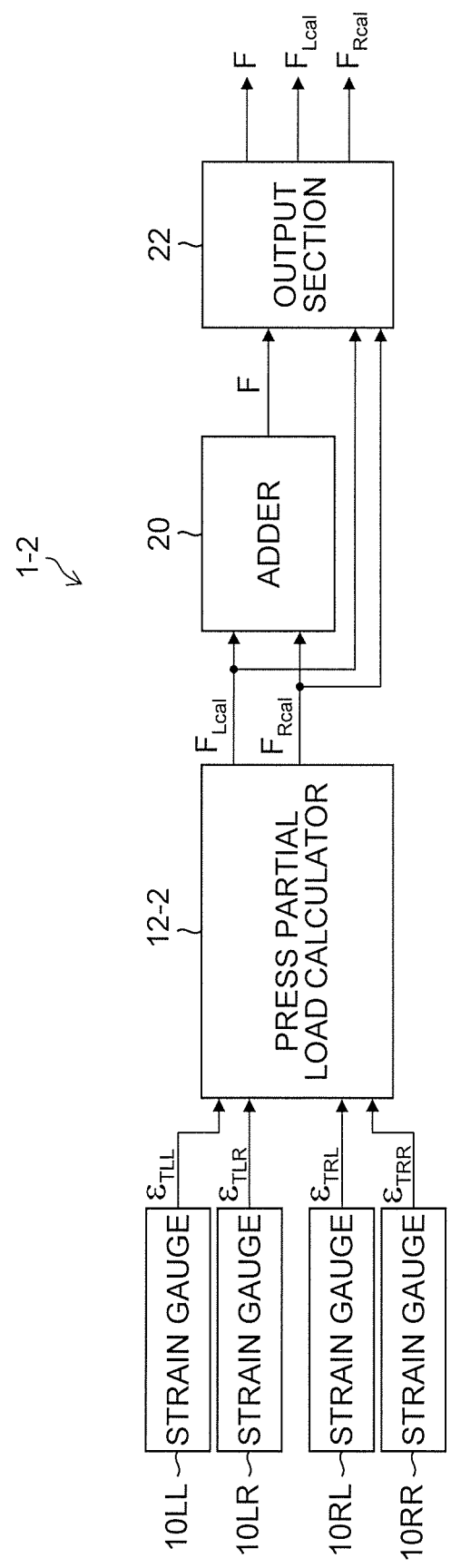
FIG. 15 is a block diagram illustrating a second embodiment of the press load measuring apparatus of a press machine.

FIG. 15 is a block diagram illustrating a second embodiment of the press load measuring apparatus of a press machine. Note that in FIG. 15, parts common to the press load measuring apparatus 1-1 of the press machine of the first embodiment illustrated in FIG. 8 are designated by the same reference numerals, and detailed description thereof will be omitted.

The press load measuring apparatus 1-2 of the press machine according to the second embodiment illustrated in FIG. 15 is different from the press load measuring apparatus 1-1 of the press machine of the first embodiment illustrated in FIG. 8 mainly in that a plurality of pairs (two pairs in this example) of the strain gauges 10LL and 10LR and the strain gauges 10RL and TORR are provided, while the bending moment calculator 14 is eliminated.

The pair of strain gauges 10LL and 10LR attached to the column 104L on the left side output the detected strain signals $\varepsilon_{TLL}$ and $\varepsilon_{TLR}$ to the press partial load calculator 12-2, and the pair of strain gauges 10RL and 10RR attached to the column 104R on the light side output the strain signal $\varepsilon_{TRL}$ and $\varepsilon_{TRR}$ to the press partial load calculator 12-2, respectively.

Figure 16:
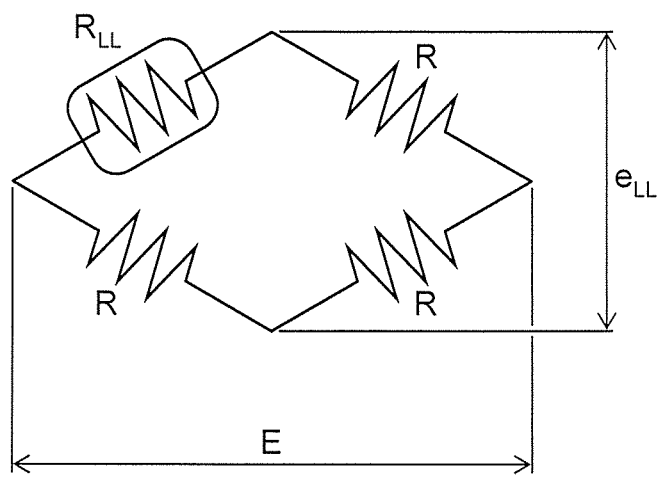
FIG. 16 illustrates a Wheatstone bridge circuit applied to the strain gauge.

The strain gauge 10LL constitutes the Wheatstone bridge circuit as shown in FIG. 16, and can detect the strain signal $\varepsilon_{TLL}$.

The Wheatstone bridge circuit shown in FIG. 16 includes a resistor $R_{LL}$ for detecting the strain and three fixed resistors R. A constant voltage E is applied to the bridge, and a voltage $e_{LL}$ is output from the bridge according to the resistance value $R_{LL}$ (the resistance value and the name of the resistance are both designated as $R_{LL}$) that changes in correspondence with the strain of the mounting surface of the strain gauge 10LL. Note that in the case where the strain is 0, the resistance value $R_{LL}$ is equal to the resistance value R of the fixed resistor R, and the voltage $e_{LL}$ is 0.

The strain gauge 10LL outputs a strain signal $\varepsilon_{TLL}$ corresponding to the voltage $e_{LL}$. Other strain gauges 10LR, 10RL, and 10RR also constitute the Wheatstone bridge circuit illustrated in FIG. 16, and can output strain signals $\varepsilon_{TLR}$ and $\varepsilon_{TRL}$, and $\varepsilon_{TRR}$.

The press partial load calculator 12-2 adds the strain signals $\varepsilon_{TLL}$ and $\varepsilon_{TLR}$ output from the pair of strain gauges 10LL and 10LR to the strain signals $\varepsilon_{TLL}$ and $\varepsilon_{TLR}$, and calculates the correct left press partial load signal $F_{Lcal}$ based on the added strain signal, as expressed in [Expression 30]. In the same manner, the press partial load calculator 12-2 adds the strain signal $\varepsilon_{TRL}$ and $\varepsilon_{TRR}$ output from the pair of strain gauges 10RL and 10RR to the strain signal $\varepsilon_{TRL}$, $\varepsilon_{TRR}$, and calculates the correct right press partial load signal $F_{Rcal}$ based on the added strain signal, as expressed in [Expression 31].

Figure 17:
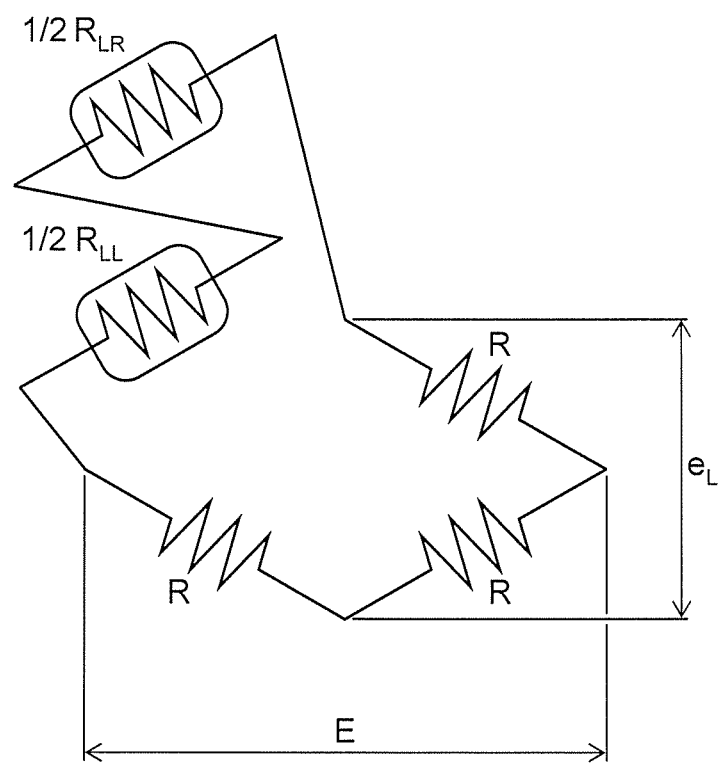
FIG. 17 is a drawing illustrating a Wheatstone bridge circuit applied to a pair of the strain gauges.

FIG. 17 is a drawing illustrating a Wheatstone bridge circuit applied to a pair of the strain gauges 10LL and 10LR.

In the Wheatstone bridge circuit shown in FIG. 17, resistors $R_{LL}/2$ and $R_{LR}/2$ of a pair of strain gauges 10LL and 10LR are connected in series. Resistance values $R_{LL}/2$ and $R_{LR}/2$ of the resistors $R_{LL}/2$ and $R_{LR}/2$ of the pair of strain gauges 10LL and 10LR in the initial state are ½ the resistance value R of the fixed resistor R of the Wheatstone bridge circuit.

The voltage $e_L$ output from the Wheatstone bridge circuit shown in FIG. 17 becomes a strain signal $\varepsilon_{FL}$ which is proportional to the left press partial load signal $F_L$. In other words, according to the Wheatstone bridge circuit shown in FIG. 17, the addition of the strain signals $\varepsilon_{TLL}$ and $\varepsilon_{TLR}$ added by the press partial load calculator 12-2 is equivalent to completion at the time of output from the Wheatstone bridge circuit. Similarly, the addition of the strain signals $\varepsilon_{TRL}$ and $\varepsilon_{TRR}$ added by the press partial load calculator 12-2 can be performed by a Wheatstone bridge circuit.

[Third Embodiment of Press Load Measuring Apparatus of Press Machine]

Figure 18:
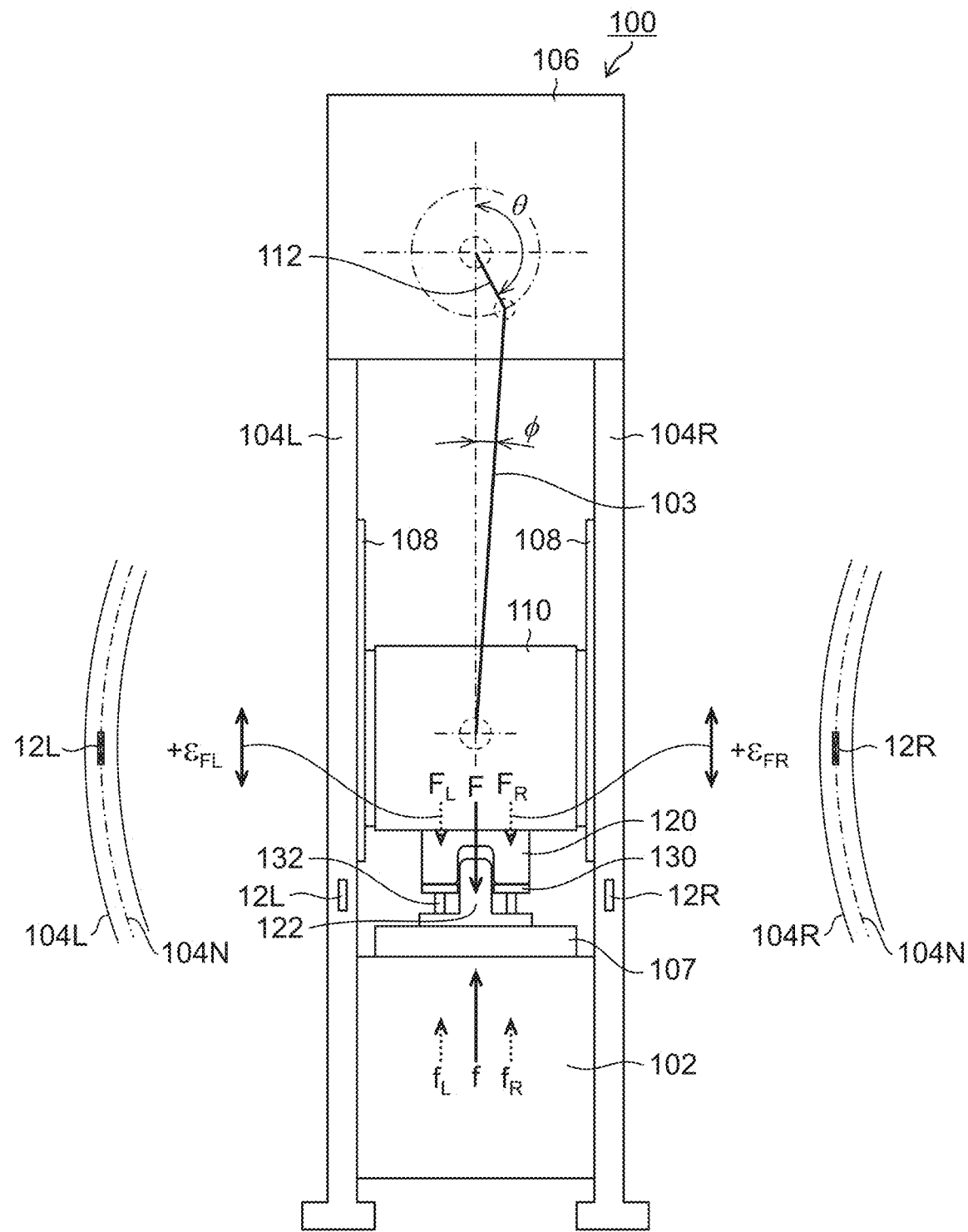
FIG. 18 is a drawing illustrating the same press machine as that illustrated in FIG. 1 and specifically illustrating a mounting positions of the strain gauges to be attached to the left and right columns.

FIG. 18 illustrates a press machine 100 which is identical to the press machine 100 shown in FIG. 1, and in particular, the mounting positions of the strain gauges 12L and 12R which are attached to the left and right columns 104L and 104R are different from those of the strain gauges 10L and 10R which are attached to the left and right columns 104L and 104R of the press machine 100 illustrated in FIG. 1.

As shown in FIG. 18, the strain gauges 12L and 12R are attached on the neutral axes 104N along the neutral axes 104N of the surfaces intersecting the neutral surfaces of the left and right columns 104L and 104R, respectively.

Assuming that $\varepsilon_{FL}$ and $\varepsilon_{FR}$ are the tensile strains generated in the strain gauge mounting parts of the left and right columns 104L and 104R by the left press partial load signal $F_L$ and the right press partial load signal $F_R$, the strain signal $\varepsilon_{TL}$ detected from the strain gauge 12L on the left side and the strain signal $\varepsilon_{TR}$ detected from the strain gauge 12R on the right side can be represented by the following Expressions.

$$\varepsilon_{TL} = \varepsilon_{FL} \qquad \text{[Expression 32]}$$

$$\varepsilon_{TR} = \varepsilon_{FR} \qquad \text{[Expression 33]}$$

[Expression 32] and [Expression 33] mean that bending strain is not applied to strain signals $\varepsilon_{TL}$ and $\varepsilon_{TR}$ detected from strain gauges 12L and 12R of the left and right columns 104L and 104R.

That is, since the strain gauges 12L and 12R are attached on the neutral axis 104N in which bending strains (proportional to bending stress) of the respective columns on which bending moments act becomes 0, no bending strain is detected.

Therefore, the left press partial load signal $F_L$ and the right press partial load signal $F_R$ can be represented by the following Expressions.

$$F_L = K\varepsilon_F \cdot \varepsilon_{TL} \qquad \text{[Expression 34]}$$

$$F_R = K\varepsilon_F \cdot \varepsilon_{TR} \qquad \text{[Expression 35]}$$

However, $K\varepsilon_F$ is a proportionality constant reaching the load value for the respective strain signal of the strain gauges which have been calibrated.

This method does not include the method of eliminating the impact of the bending strain acting on of the respective columns 104L and 104R, and correspondingly, the measurement accuracy of the respective press partial load signals is improved.

Figure 19:
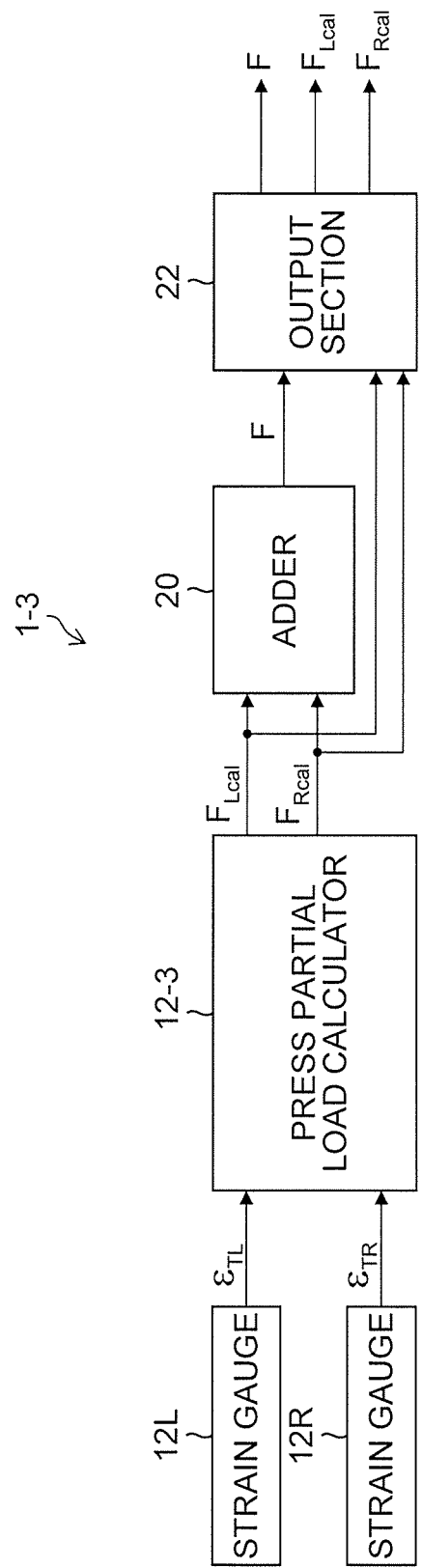
FIG. 19 is a block diagram illustrating a third embodiment of the press load measuring apparatus of a press machine.

FIG. 19 is a block diagram illustrating a third embodiment of the press load measuring apparatus of a press machine. Note that in FIG. 19, parts common to the press load measuring apparatus 1-2 of the press machine of the second embodiment illustrated in FIG. 15 are designated by the same reference numerals, and detailed description thereof will be omitted.

The press load measuring apparatus 1-3 of the press machine according to the third embodiment illustrated in FIG. 19 is different from the press load measuring apparatus 1-2 of the press machine of the second embodiment illustrated in FIG. 15 mainly in that the strain gauges 12L and 12R are attached on the neutral axes 104N of the respective columns 104L and 104R are provided instead of the two pairs of the strain gauges 10LL and 10LR and the strain gauges 10RL and 10RR.

The strain gauges 12L and 12R attached on the neutral axes 104N of the left and right columns 104L and 104R respectively output the detected strain signals $\varepsilon_{TL}$ and $\varepsilon_{TR}$ to the press partial load calculator 12-3.

Note that the respective strain gauges 12L and 12R constitute a Wheatstone bridge circuit as illustrated in FIG. 16, and can detect the strain signals $\varepsilon_{TL}$ and $\varepsilon_{TR}$.

As expressed in [Expression 34] and [Expression 35], the press partial load calculator 12-3 calculates the correct left press partial load signal $F_{Lcal}$ and the correct right press partial load signal $F_{Rcal}$ based on the strain signals $\varepsilon_{TL}$ and $\varepsilon_{TR}$ output from the strain gauges 12L and 12R.

Note that in the press load measuring apparatus 1-2 of the press machine of the second embodiment and the press load measuring apparatus 1-3 of the press machine of the third embodiment, the correction may be performed by the slide inertial force signal G in the same manner as the press load measuring apparatus 1-1' of the press machine according to the modified example of the first embodiment illustrated in FIG. 12 when the correct left press partial load signal $F_{Lcal}$ and the correct right press partial load signal $F_{Rcal}$ are calculated.

[Press Load Measuring Method of Press Machine of First Embodiment]

Figure 20:
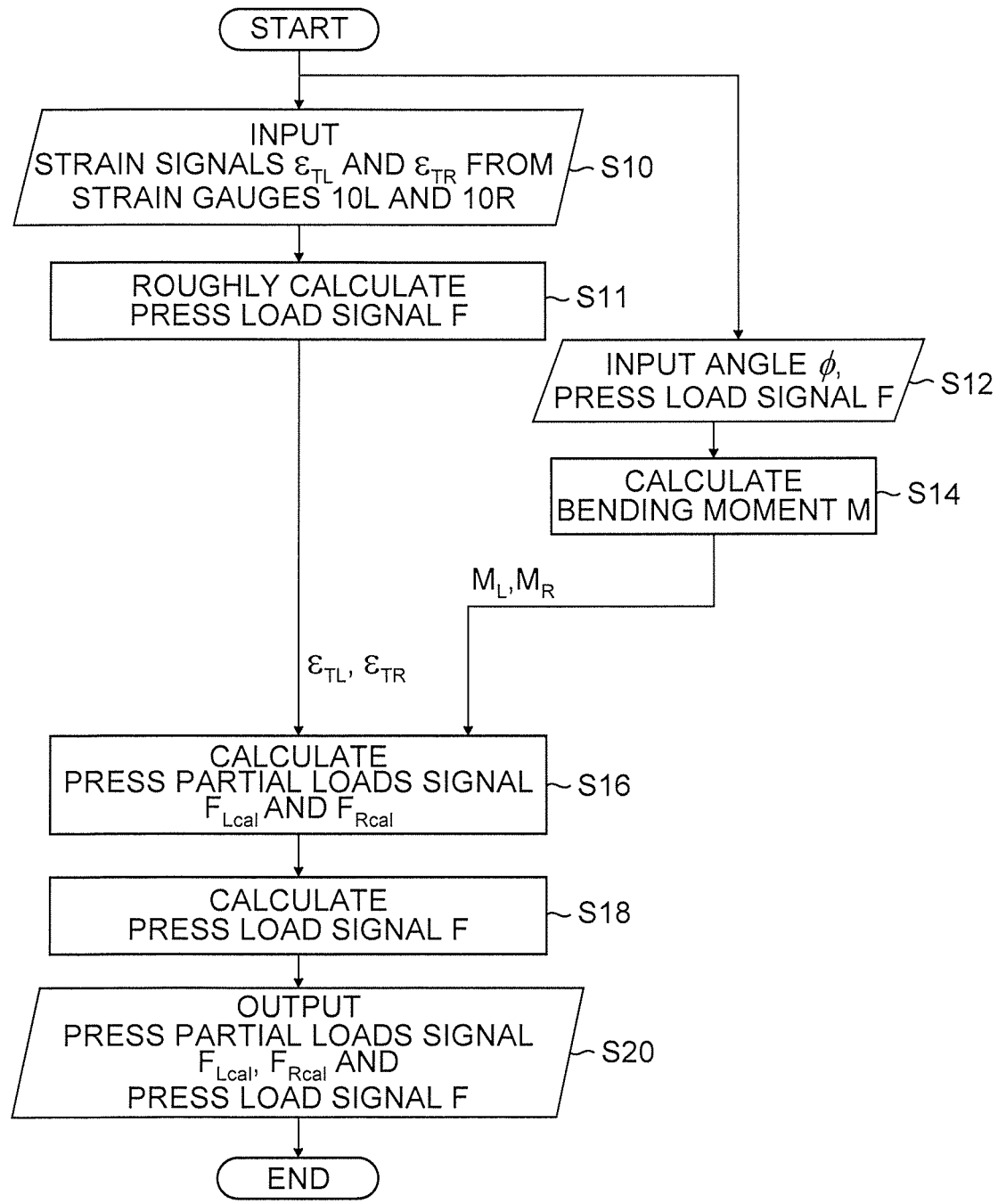
FIG. 20 is a flowchart showing a press load measuring method for the press machine according to the first embodiment.

FIG. 20 is a flowchart showing a press load measuring method for the press machine according to the first embodiment. Note that the press load measuring method of the press machine of the first embodiment is a method corresponding to the press load measuring apparatus 1-1 of the press machine of the first embodiment illustrated in FIG. 8.

In FIG. 20, the press partial load calculator 12-1 inputs the strain signals $\varepsilon_{TL}$ and $\varepsilon_{TR}$ from the strain gauges 10L and 10R attached to the left and right columns 104L and 104R (step S10). The press partial load calculator 12-1 calculates the press load signal F indicating a rough total press load signal sum based on the input strain signals $\varepsilon_{TL}$ and $\varepsilon_{TR}$ (step S11).

At the same time, the bending moment calculator 14 inputs the angle signal ϕ indicating the angle formed between the connecting rod 103 and the perpendicular line to the angle detector 16 and the press load signal F indicating the total press load signal calculated in step S11 (step S12). The bending moment calculator 14 calculates bending moments M acting on the frames based on these inputs, and calculates bending moments $M_L$ and $M_R$ transmitted respectively to the respective columns 104L and 104R by using

[Expression 7] and [Expression 8] based on the calculated bending moments M (step S14).

Based on the bending moments $M_L$ and $M_R$ input from the bending moment calculator 14, the press partial load calculator 12-1 calculates the bending strain calculated value $\varepsilon_{MLcal}$ and $\varepsilon_{MRcal}$ acting on the inner surfaces of the left and right columns 104L and 104R by using [Expression 12] and [Expression 13], and further, calculates the left calculated value $F_{Lcal}$, and the right calculated value $F_{Rcal}$ of the correct press partial load signal with the errors caused by the bending strains eliminated by using [Expression 19] and [Expression 20] based on the strain signals $\varepsilon_{TL}$ and $\varepsilon_{TR}$ and the bending strain calculated value $\varepsilon_{MLcal}$ and $\varepsilon_{MRcal}$ input from the strain gauges 10L and 10R (Step S16).

The adder 20 adds the left calculated value $F_{Lcal}$ and the right calculated value $F_{Rcal}$ of the press partial load signals to calculate the sum (total) of the press partial load signal as the press load signal F (Step S18).

The output section 22 outputs the press load signal F, the left calculated value $F_{Lcal}$ and the right calculated value $F_{Rcal}$ of the press load signals to a monitor device, a printer, a storage device, and the like, not illustrated, so that the correct press partial load signals can be provided to the user (Step S20).

The series of processes from step S10 to step S20 are performed at a high speed, whereby the press load signal F, the left calculated value $F_{Lcal}$ and the right calculated value $F_{Rcal}$ of the press partial load signals, which change momentarily, in real time can be acquired.

[Press Load Measuring Method of Press Machine According to Modified Example of First Embodiment]

Figure 21:
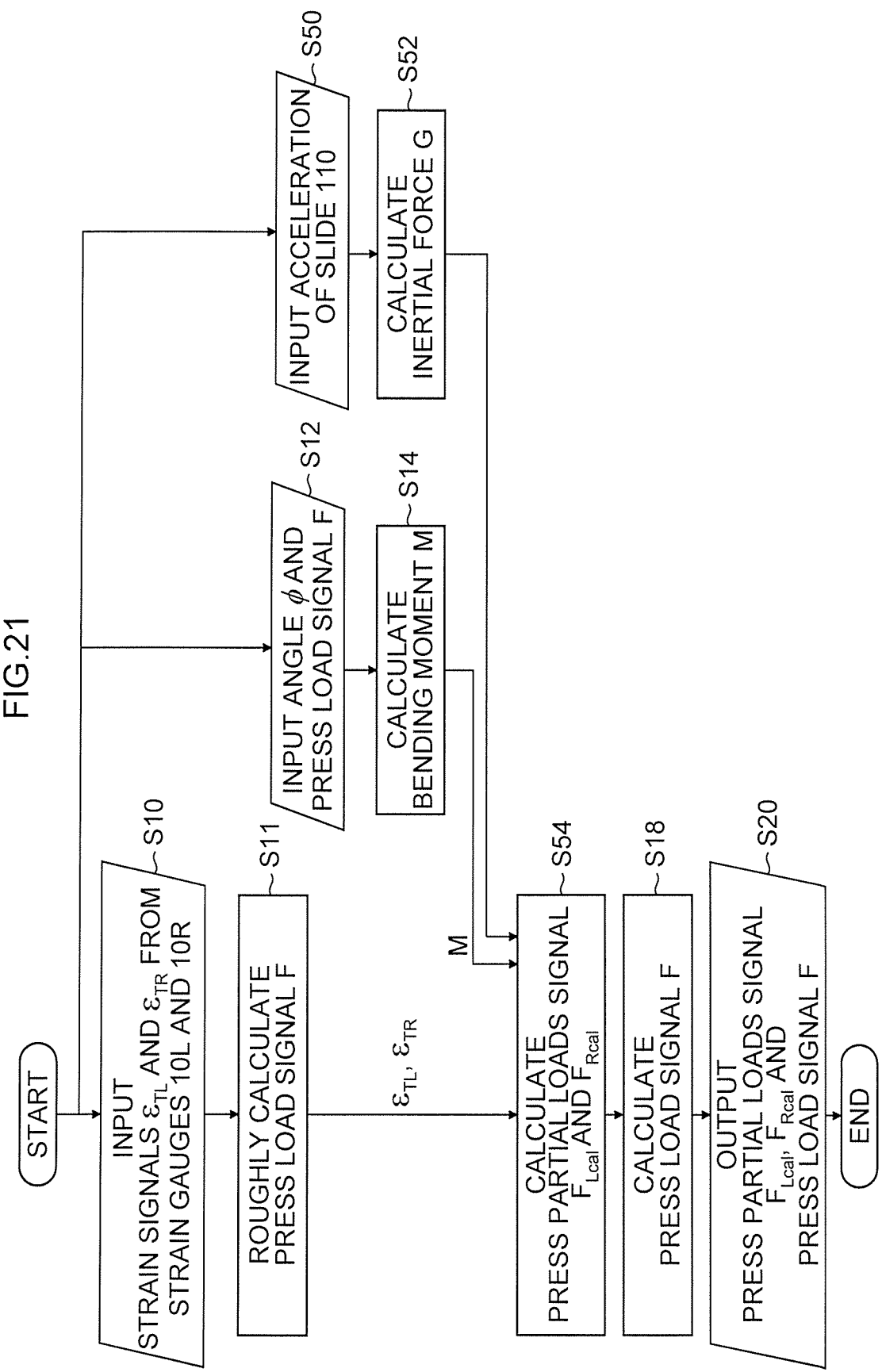
FIG. 21 is a flowchart showing a press load measuring method for the press machine according to a modified example of the first embodiment.

FIG. 21 is a flowchart showing a press load measuring method for the press machine according to a modified example of the first embodiment.

The press load measuring method of the press machine of the modified example of the first embodiment is a method corresponding to the press load measuring apparatus 1-1' of the press machine of the modified example of the first embodiment illustrated in FIG. 12. Note that in FIG. 21, parts common to those in the first embodiment shown in FIG. 20 are designated by the same step numbers, and detailed description thereof will be omitted.

A modified example of the first embodiment illustrated in FIG. 21 is different from the first embodiment illustrated in FIG. 20 in that Steps S50 and S52 are added and the processing of Step S54 is performed instead of step S16 of the first embodiment.

In FIG. 21, the inertial force calculator 30 inputs an acceleration α of the slide 110 (step S50). The acceleration α can be obtained by differentiating the slide position signal S two times. The inertial force calculator 30 calculates the slide inertial force signal G based on the slide 110, the mass Ma of the upper mold 120 associated with the slide 110, and the input acceleration α using [Expression 21] (Step S52).

The press partial load calculator 12-1' calculates the left calculated value $F_{Lcal}$ and the right calculated value $F_{Rcal}$ of the correct press partial load signal based on [Expression 22] and [Expression 23]. In other words, the press partial load calculator 12-1' is different from the press partial load calculator 12-1 of the first embodiment in that correction by the slide inertial force signal G is performed (Step S54).

In the case where the press machine is of a large size and of 1-point type, the correction based on the slide inertial force is effective.

[Press Load Measuring Method of Press Machine of Second Embodiment]

Figure 22:
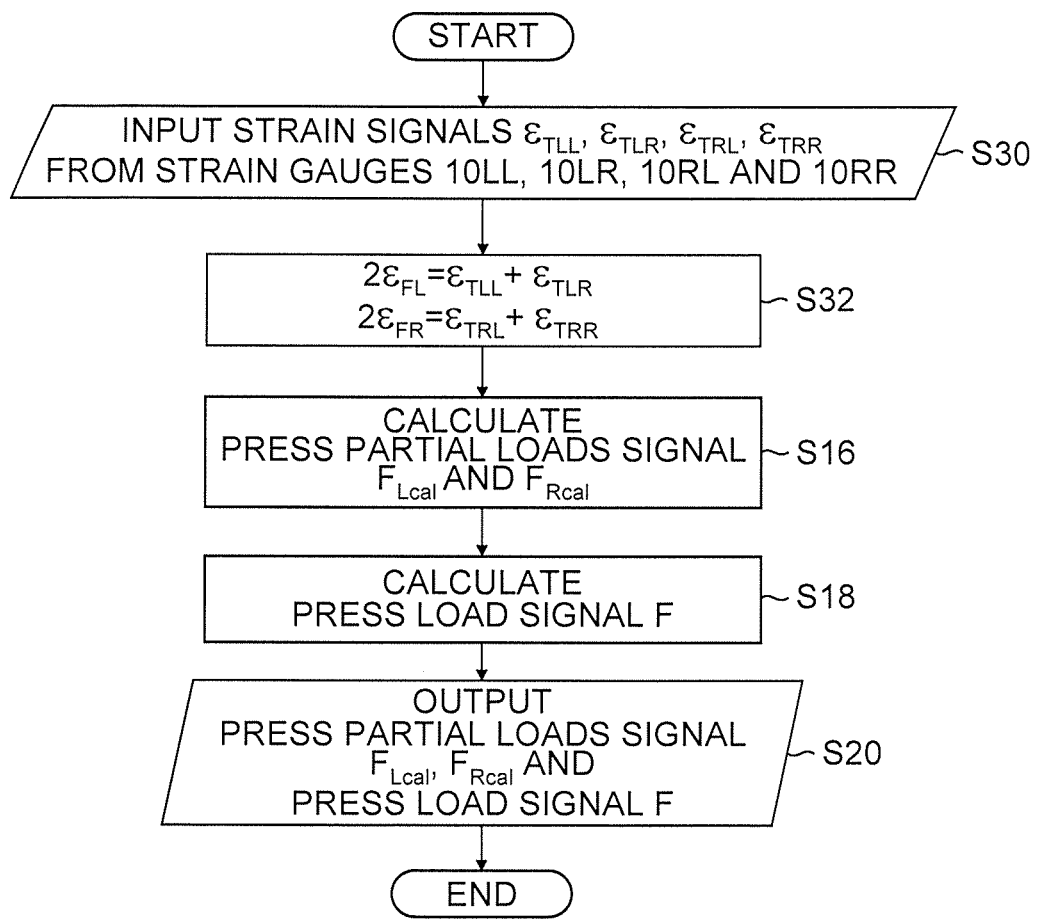
FIG. 22 is a flowchart showing a press load measuring method for the press machine according to the second embodiment.

FIG. 22 is a flowchart showing a press load measuring method for the press machine according to the second embodiment.

Note that the press load measuring method of the press machine of the second embodiment is a method corresponding to the press load measuring apparatus 1-2 of the press machine of the second embodiment illustrated in FIG. 15. In FIG. 22, parts common to the flowchart of the first embodiment illustrated in FIG. 20 are designated by the same step numbers, and detailed description thereof will be omitted.

In FIG. 22, the press partial load calculator 12-2 receives the strain signals $\varepsilon_{TLL}$ and $\varepsilon_{TLR}$ and the strain signals $\varepsilon_{TRL}$ and $\varepsilon_{TRR}$ from a pair of strain gauges 10LL and 10LR mounted on the column 104L on the left side and a pair of strain gauges 10RL and 10RR attached to the column 104R on the right side (step S30).

The press partial load calculator 12-2 generates a strain signal ($2 \cdot \varepsilon_{TL}$) obtained by adding the pair of strain signals $\varepsilon_{TLL}$ and $\varepsilon_{TLR}$ and eliminating the bending strains, and similarly generating a strain signal ($2 \varepsilon_{TR}$) obtained by adding the pair of strain signals $\varepsilon_{TRL}$ and $\varepsilon_{TRR}$ and eliminating the bending strains (Step S32), and calculates the correct left press partial load signal $F_{Lcal}$ and the correct right press partial load signal $F_{Rcal}$ based on the added strain signal ($2 \cdot \varepsilon_{TL}$) and the added strain signal ($2 \cdot \varepsilon_{TR}$) (step S16).

[Press Load Measuring Method of Press Machine of Third Embodiment]

Figure 23:
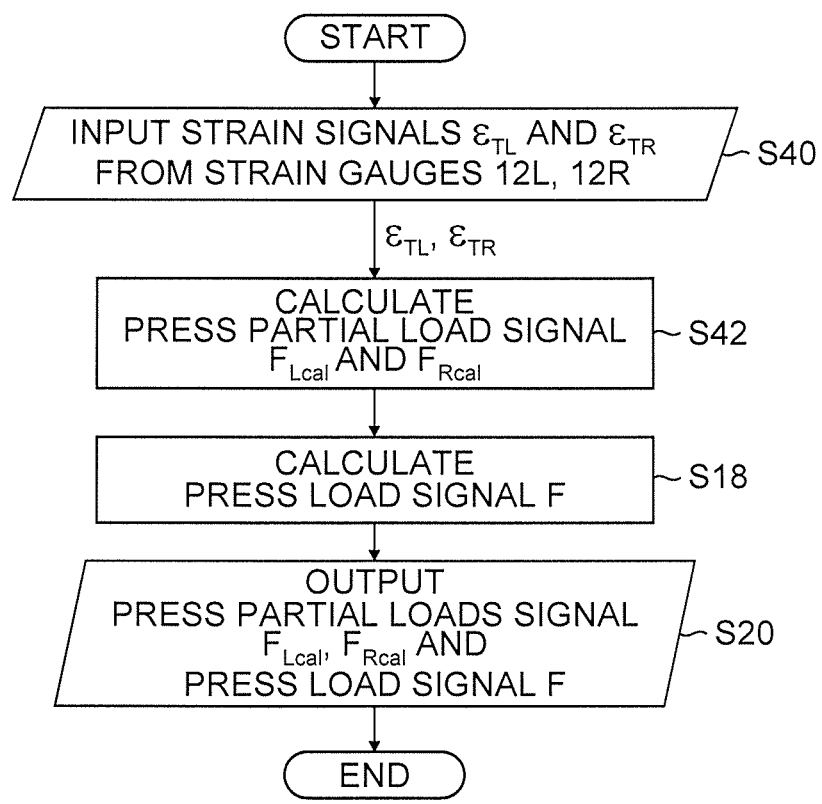
FIG. 23 is a flowchart showing a press load measuring method for the press machine according to the third embodiment.

FIG. 23 is a flowchart showing a press load measuring method for the press machine according to the third embodiment.

Note that the press load measuring method of the press machine of the third embodiment is a method corresponding to the press load measuring apparatus 1-3 of the press machine of the third embodiment illustrated in FIG. 19. In FIG. 23, parts common to the flowchart of the first embodiment illustrated in FIG. 20 are designated by the same step numbers, and detailed description thereof will be omitted.

In FIG. 23, the press partial load calculator 12-3 inputs the strain signals $\varepsilon_{TL}$ and $\varepsilon_{TR}$ from the left and right strain gauges 12L and 12R, respectively (Step S40).

Here, since the strain gauge 12L is attached on the neutral axis 104N of the column 104L on the left side and the strain gauge 12R is attached on the neutral axis 104N of the right column 104R, the bending strain caused by the bending moment M acting on the frame does not act on the strain signals $\varepsilon_{TL}$ and $\varepsilon_{TR}$ detected by the strain gauges 12L and 12R.

Based on the strain signals $\varepsilon_{TL}$ and $\varepsilon_{TR}$ input from the strain gauges 12L and 12R, the press partial load calculator 12-3 calculates the left press partial load signal $F_{Lcal}$ and the right press partial load signal $F_{Rcal}$ by using [Expression 34] and [Expression 35] (Step S42). In other words, the press partial load calculator 12-3 can calculate the correct left press partial load signal $F_{Lcal}$ and the correct right press partial load signal $F_{Rcal}$ without performing the calculation for eliminating the bending strain.

[Others] Although the press machine of this embodiment includes two left and right columns, the invention is applicable to press machines having more than two columns, in which case the strain gauges also need to be attached to the respective columns of the plurality of columns.

Although a case has been described as an example in which the slide is swung, and thus driven to make pendulum movement about the bottom dead center by approximately 14 mm without returning the slide to the top dead center, the invention is applicable not only to the press machine to be driven to make the pendulum movement.

Further, the invention is not limited to the embodiments described above, and it goes without saying that various modified examples can be made without departing from the spirit of the invention.

What is claimed is:

1. A press load measuring apparatus for a press machine of 1-point type configured to drive a slide via one connecting rod, the press load measuring apparatus comprising:
   a plurality of strain gauges attached to a plurality of columns of the press machine respectively, the plurality of strain gauges configured to detect respective strains generated in the plurality of columns in association with a press load acting on the slide,
   a bending moment calculator configured to calculate bending moments acting on respective columns of the plurality of columns based on an angle formed between a direction of movement of the slide and the connecting rod, and
   a press partial load calculator including a bending strain calculator configured to calculate bending strains caused by the bending moments based on the bending moments acting on the respective columns for the respective columns, the press partial load calculator being configured to respectively calculate press partial loads corresponding to the respective columns of the plurality of columns based on the strains detected by the strain gauges attached to the respective columns of the plurality of columns and the bending strains calculated for the respective columns.

2. The press load measuring apparatus for a press machine according to claim 1, wherein the bending moment calculator calculates bending moments acting on the respective columns of the plurality of columns based on an angle formed between the direction of movement of the slide and the connecting rod and the press load acting in the direction of movement of the slide.

3. The press load measuring apparatus for a press machine according to claim 1, wherein the press partial load calculator comprises:
   a first press partial load calculator configured to calculate first press partial loads corresponding to the respective columns of the plurality of columns based on the strains detected by the strain gauges attached to the respective columns; and
   an error calculator configured to calculate errors caused by the bending moments included in the first press partial loads based on the bending strains calculated by the bending strain calculator for the respective columns for the respective columns of the plurality of columns, wherein
   the press partial load calculator eliminates the errors calculated for the respective columns from the first press partial loads calculated for the respective columns to calculate the press partial loads corresponding to the respective columns.

4. The press load measuring apparatus for a press machine according to claim 1, wherein the press partial load calculator comprises
   a strain calculator configured to calculate calibrated strains by removing the bending strains calculated by the bending strain calculator for the respective columns from the strains detected by the strain gauges attached to the respective columns, and
   wherein the press partial loads corresponding to the respective columns of the plurality of columns are calculated based on the calculated strains of the respective columns after the calibration.

5. The press load measuring apparatus for a press machine according to claim 1, further comprising an adder configured to calculate a total press partial load as the press load.

6. The press load measuring apparatus for a press machine according to claim 5, further comprising an output section configured to output the press partial loads calculated for the respective columns, or the press partial loads and the press load.

7. The press load measuring apparatus for a press machine according to claim 1, further comprising:
   an inertial force calculator configured to calculate an inertial force proportional to a product of a mass of the slide and a member connected to the slide and an acceleration in the direction of movement of the slide, wherein
   the press partial load calculator eliminates an inertial force acting on the respective columns out of the calculated inertial force from the press partial loads corresponding to the respective columns of the plurality of columns, thereby further calibrating the press partial loads.

8. A press load measuring method for a press machine of 1-point type configured to drive a slide via one connecting rod, the method comprising:
   attaching strain gauges respectively to a plurality of columns of the press machine, the strain gauges detecting strains generated in the respective columns in association with a press load acting on the slide;
   calculating bending moments acting on the respective columns of the plurality of columns by a bending moment calculator based on an angle formed between a direction of movement of the slide and the connecting rod,
   calculating bending strains caused by the bending moments based on the bending moments acting on the respective columns, for the respective columns, by a bending strain calculator; and
   calculating press partial loads corresponding to the respective columns of the plurality of columns respectively by a press partial load calculator based on the strains detected by the strain gauges attached to the respective columns of the plurality of columns and the bending strains calculated for the respective columns.

9. The press load measuring method for a press machine according to claim 8, further comprising calculating a total press partial load as the press load by an adder.

10. The press load measuring method for a press machine according to claim 9, further comprising outputting the press partial loads calculated for the respective columns, or the press partial loads and the press load by an output section.

11. The press load measuring method for a press machine according to claim 8, further comprising:
    calculating an inertial force proportional to a product of a mass of the slide and a member connected to the slide and an acceleration in the direction of movement of the slide; and
    eliminating an inertial force acting on the respective columns out of the calculated inertial force from the press partial loads corresponding to the respective columns of the plurality of columns by the press partial load calculator, thereby further calibrating the press partial loads.

* * * * *